US011916725B2

(12) United States Patent
Bai et al.

(10) Patent No.: US 11,916,725 B2
(45) Date of Patent: Feb. 27, 2024

(54) DETERMINING A DURATION OF A RESETTING TIME PERIOD AFTER UPLINK BEAM FAILURE

(71) Applicant: QUALCOMM Incorporated, San Diego, CA (US)

(72) Inventors: Tianyang Bai, Somerville, NJ (US); Yan Zhou, San Diego, CA (US); Tao Luo, San Diego, CA (US); Junyi Li, Chester, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 95 days.

(21) Appl. No.: 17/153,616

(22) Filed: Jan. 20, 2021

(65) Prior Publication Data
US 2021/0250227 A1 Aug. 12, 2021

Related U.S. Application Data

(60) Provisional application No. 62/971,787, filed on Feb. 7, 2020.

(51) Int. Cl.
H04L 41/0668 (2022.01)
H04W 72/0446 (2023.01)
H04L 41/0677 (2022.01)

(52) U.S. Cl.
CPC ...... *H04L 41/0668* (2013.01); *H04L 41/0677* (2013.01); *H04W 72/0446* (2013.01)

(58) Field of Classification Search
CPC . H04L 41/0668; H04L 41/0677; H04L 41/06; H04L 5/0055; H04L 27/26025; H04L 5/001; H04L 5/0023; H04L 5/0064; H04L 5/0096; H04W 72/0446;
(Continued)

(56) References Cited

U.S. PATENT DOCUMENTS 9,900,891 B1 * 2/2018 Islam ............... H04B 7/0695
2018/0042000 A1 * 2/2018 Zhang ............. H04W 72/042
2018/0048358 A1 * 2/2018 Li .................... H04B 7/0404
(Continued)

FOREIGN PATENT DOCUMENTS

CN 111344954 A 6/2020

OTHER PUBLICATIONS

CATT: "Considerations on Beam Recovery Mechanism", 3GPP Draft, R1-1702078, 3GPP TSG RAN WG1 Meeting #88, 3rd Generation Partnership Project (3GPP), Mobile Competence Centre, 650, Route Des Lucioles, F-06921, Sophia-Antipolis, Cedex, France, vol. RAN WG1, No. Athens, Greece, Feb. 13, 2017-Feb. 17, 2017, Feb. 12, 2017 (Feb. 12, 2017), XP051209239, 4 pages, Retrieved from the Internet: URL:http://www.3gpp.org/ftp/Meetings_3GPP_SYNC/RAN1/Docs/, [retrieved on Feb. 12, 2017] section 2.1.
(Continued)

*Primary Examiner* — Chirag G Shah
*Assistant Examiner* — Joshua Smith
(74) *Attorney, Agent, or Firm* — Harrity & Harrity, LLP

(57) ABSTRACT

Various aspects of the present disclosure generally relate to wireless communication. In some aspects, a user equipment may detect an uplink beam failure event for a first beam, report the uplink beam failure event, and determine a duration of a resetting time period before communicating via a second beam. Numerous other aspects are provided.

30 Claims, 11 Drawing Sheets

(58) Field of Classification Search
CPC ........... H04W 36/305; H04W 36/0077; H04W 36/06; H04B 7/0408; H04B 7/063; H04B 7/0695
See application file for complete search history.

(56) References Cited

U.S. PATENT DOCUMENTS

| | | | | |
|---|---|---|---|---|
| 2018/0083753 | A1 | 3/2018 | Nagaraja et al. | |
| 2018/0278318 | A1* | 9/2018 | Chakraborty | H04W 52/146 |
| 2018/0302889 | A1* | 10/2018 | Guo | H04W 72/046 |
| 2019/0090143 | A1 | 3/2019 | Luo et al. | |
| 2019/0253122 | A1* | 8/2019 | Yang | H04B 7/0695 |
| 2020/0008228 | A1* | 1/2020 | Lee | H04L 5/0048 |
| 2020/0059398 | A1* | 2/2020 | Pan | H04L 41/0654 |
| 2020/0244337 | A1* | 7/2020 | Yuan | H04W 72/0466 |
| 2020/0329503 | A1* | 10/2020 | Da Silva | H04W 36/0055 |
| 2020/0350971 | A1* | 11/2020 | Hakola | H04L 5/0048 |
| 2021/0006456 | A1* | 1/2021 | Kim | H04L 41/0668 |
| 2021/0218457 | A1* | 7/2021 | Xu | H04W 72/046 |
| 2021/0281308 | A1* | 9/2021 | Wong | H04B 7/0408 |
| 2021/0328650 | A1* | 10/2021 | Awad | H04W 72/0453 |
| 2021/0409094 | A1* | 12/2021 | Yuan | H04W 72/046 |
| 2022/0022207 | A1* | 1/2022 | Matsumura | H04L 5/0092 |
| 2022/0086715 | A1* | 3/2022 | Hong | H04B 7/088 |
| 2022/0174685 | A1* | 6/2022 | Lee | H04W 72/1284 |

OTHER PUBLICATIONS

International Search Report and Written Opinion—PCT/US2021/070059—ISA/EPO—dated Apr. 30, 2021.
Mediatek Inc: "Enhancements on Multi-Beam Operations", 3GPP Draft, R1-1912135, 3GPP TSG RAN WG1 #99, 3rd Generation Partnership Project (3GPP), Mobile Competence Centre, 650, Route Des Lucioles, F-06921, Sophia-Antipolis, Cedex, France, vol. RAN WG1, No. Reno, USA, Nov. 18, 2019-Nov. 22, 2019, Nov. 9, 2019 (Nov. 9, 2019), XP051823216, 10 pages, Retrieved from the Internet: URL:https://ftp.3gpp.org/tsg_ran/WG1_RL1/TSGR1_99/Docs/ R1-1912135.zip, R1-1912135 Multi-Beam Operation.docx [retrieved on Nov. 9, 2019] section 4.
Nokia, et al., "FL Summary 4 on "Others" Under Multi-RAT Dual-Connectivity and Carrier Aggregation Enhancements", 3GPP Draft, R1-1913523, 3GPP TSG RAN WG1 Meeting #99, 3rd Generation Partnership Project (3GPP), Mobile Competence Centre, 650, Route Des Lucioles, F-06921, Sophia-Antipolis Cedex, France, vol. RAN WG1, No. Reno, NV, USA, Nov. 18, 2019-Nov. 22, 2019, Nov. 25, 2019 (Nov. 25, 2019), XP051830804, 9 pages, Retrieved from the Internet: URL:https://ftp.3gpp.org/tsg_ran/WG1_RL1/TSGR1_99/Docs/R1-1913523.zip, R1-1913523 Ft. Summary4-DTHR 7.2.13.6.docx, [retrieved on Nov. 25, 2019] p. 3.
Qualcomm Incorporated: "Enhancements on Multi-Beam Operation", 3GPP Draft, R1-1912968, 3GPP TSG-RAN WG1 Meeting #99, 3rd Generation Partnership Project (3GPP), Mobile Competence Centre, 650, Route Des Lucioles, F-06921 Sophia-Antipolis Cedex, France, vol. RAN WG1. No. Reno, Nevada, US, Nov. 18, 2019-Nov. 22, 2019, Nov. 9, 2019 (Nov. 9, 2019), XP051823730, pp. 1-20, Retrieved from the Internet: URL:https://ftp.3gpp.org/tsg_ran/WG1_RL1/TSGR1_99/Docs/R1-1912968.zip, R1-1912968 Enhancements on Multi-beam Operation.docx [retrieved on Nov. 9, 2019] sections 2.1. 2.2.2.3, 2.5 7A.
Vivo: "Remaining Issues on Multi-Beam Transmission", 3GPP Draft, 3GPP TSG RAN WG1 #99, R1-1912040, 3rd Generation Partnership Project (3GPP), Mobile Competence Centre, 650, Route Des Lucioles, F-06921, Sophia-Antipolis Cedex, France, vol. RAN WG1, No. Reno, USA, Nov. 18, 2019-Nov. 22, 2019, Nov. 8, 2019 (Nov. 8, 2019), XP051819923, 10 pages, Retrieved from the Internet: URL: https://ftp.3gpp.org/tsg_ran/WG1_RL1/TSGR1_99/Docs/R1-1912040.zip, R1-1912040 Remaining Issues on Multi-Beam Transmission.doc [retrieved on Nov. 8, 2019] p. 7.

* cited by examiner

DETERMINING A DURATION OF A RESETTING TIME PERIOD AFTER UPLINK BEAM FAILURE

CROSS-REFERENCE TO RELATED APPLICATION

This Patent Application claims priority to Provisional Patent Application No. 62/971,787, filed on 7 Feb. 2020, entitled "DETERMINING A DURATION OF A RESETTING TIME PERIOD AFTER UPLINK BEAM FAILURE," and assigned to the assignee hereof. The disclosure of the prior Application is considered part of and is incorporated by reference in this Patent Application.

FIELD OF THE DISCLOSURE

Aspects of the present disclosure generally relate to wireless communication and to techniques and apparatuses for determining a duration of a resetting time period after uplink beam failure.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, and/or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless communication network may include a number of base stations (BSs) that can support communication for a number of user equipment (UEs). A UE may communicate with a BS via the downlink and uplink. The downlink (or forward link) refers to the communication link from the BS to the UE, and the uplink (or reverse link) refers to the communication link from the UE to the BS. As will be described in more detail herein, a BS may be referred to as a Node B, a gNB, an access point (AP), a radio head, a transmit receive point (TRP), a New Radio (NR) BS, a 5G Node B, and/or the like.

The above multiple access technologies have been adopted in various telecommunication standards to provide a common protocol that enables different UEs to communicate on a municipal, national, regional, and even global level. NR, which may also be referred to as 5G, is a set of enhancements to the LTE mobile standard promulgated by 3GPP. NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. However, as the demand for mobile broadband access continues to increase, there exists a need for further improvements in LTE and NR technologies. Preferably, these improvements should be applicable to other multiple access technologies and the telecommunication standards that employ these technologies.

SUMMARY

In some aspects, a method of wireless communication, performed by a UE, may include detecting an uplink beam failure event for a first beam, reporting the uplink beam failure event, and determining a duration of a resetting time period before communicating via a second beam.

In some aspects, a method of wireless communication, performed by a base station, may include identifying an uplink beam failure event of a first beam based at least in part on an uplink beam failure report received from a UE, transmitting, to the UE, a response to the uplink beam failure report, and determining a duration of a resetting time period before communicating with the UE via a second beam.

In some aspects, a UE for wireless communication may include memory and one or more processors operatively coupled to the memory. The memory and the one or more processors may be configured to detect an uplink beam failure event for a first beam, report the uplink beam failure event, and determine a duration of a resetting time period before communicating via a second beam.

In some aspects, a base station for wireless communication may include memory and one or more processors operatively coupled to the memory. The memory and the one or more processors may be configured to identify an uplink beam failure event of a first beam based at least in part on an uplink beam failure report received from a UE, transmit, to the UE, a response to the uplink beam failure report, and determine a duration of a resetting time period before communicating with the UE via a second beam.

In some aspects, a non-transitory computer-readable medium may store one or more instructions for wireless communication. The one or more instructions, when executed by one or more processors of a UE, may cause the one or more processors to: detect an uplink beam failure event for a first beam, report the uplink beam failure event, and determine a duration of a resetting time period before communicating via a second beam.

In some aspects, a non-transitory computer-readable medium may store one or more instructions for wireless communication. The one or more instructions, when executed by one or more processors of a base station, may cause the one or more processors to: identify an uplink beam failure event of a first beam based at least in part on an uplink beam failure report received from a UE, transmit, to the UE, a response to the uplink beam failure report, and determine a duration of a resetting time period before communicating with the UE via a second beam.

In some aspects, an apparatus for wireless communication may include means for detecting an uplink beam failure event for a first beam, means for reporting the uplink beam failure event, and means for determining a duration of a resetting time period before communicating via a second beam.

In some aspects, an apparatus for wireless communication may include means for identifying an uplink beam failure event of a first beam based at least in part on an uplink beam failure report received from a UE, means for transmitting, to the UE, a response to the uplink beam failure report, and means for determining a duration of a resetting time period before communicating with the UE via a second beam.

Aspects generally include a method, apparatus, system, computer program product, non-transitory computer-readable medium, UE, base station, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, and/or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with 3G and/or 4G wireless technologies, aspects of the present disclosure can be applied in other generation-based communication systems, such as 5G and later, including New Radio (NR) technologies.

Figure 1:
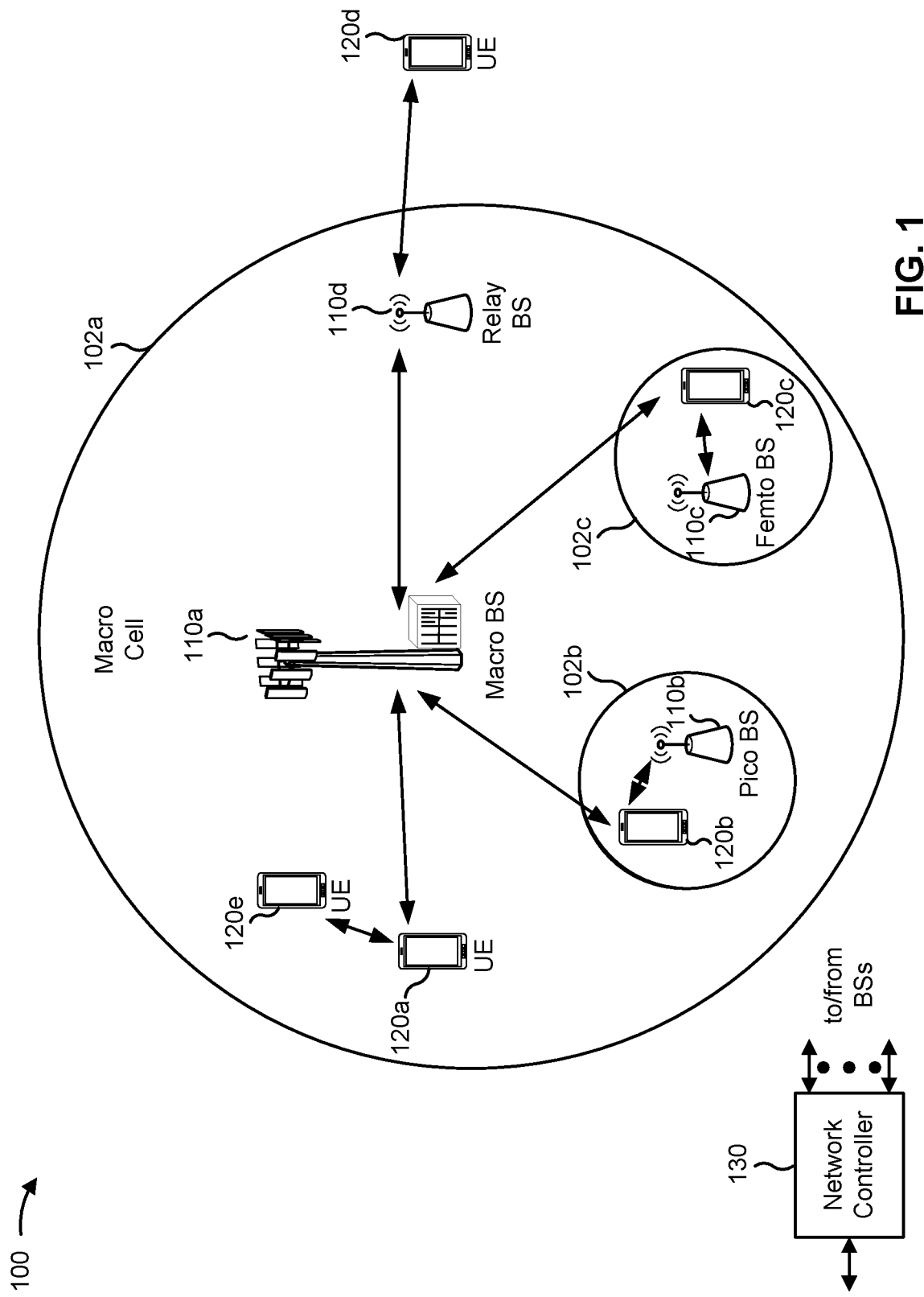
FIG. 1 is a block diagram illustrating an example of a wireless communication network, in accordance with various aspects of the present disclosure.

FIG. 1 is a diagram illustrating a wireless network 100 in which aspects of the present disclosure may be practiced. The wireless network 100 may be an LTE network or some other wireless network, such as a 5G or NR network. The wireless network 100 may include a number of BSs 110 (shown as BS 110a, BS 110b, BS 110c, and BS 110d) and other network entities. A BS is an entity that communicates with UEs and may also be referred to as a base station, a NR BS, a Node B, a gNB, a 5G node B (NB), an access point, a transmit receive point (TRP), and/or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). A BS for a macro cell may be referred to as a macro BS. A BS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces such as a direct physical connection, a virtual network, and/or the like using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay station 110d may communicate with macro BS 110a and a UE 120d in order to facilitate communication between BS 110a and UE 120d. A relay station may also be referred to as a relay BS, a relay base station, a relay, and/or the like.

Wireless network 100 may be a heterogeneous network that includes BSs of different types, e.g., macro BSs, pico BSs, femto BSs, relay BSs, and/or the like. These different types of BSs may have different transmit power levels, different coverage areas, and different impacts on interference in wireless network 100. For example, macro BSs may have a high transmit power level (e.g., 5 to 40 watts) whereas pico BSs, femto BSs, and relay BSs may have lower transmit power levels (e.g., 0.1 to 2 watts).

A network controller 130 may couple to a set of BSs and may provide coordination and control for these BSs. Network controller 130 may communicate with the BSs via a backhaul. The BSs may also communicate with one another, e.g., directly or indirectly via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, and/or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, location tags, and/or the like, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a Customer Premises Equipment (CPE). UE 120 may be included inside a housing that houses components of UE 120, such as processor components, memory components, and/or the like.

In general, any number of wireless networks may be deployed in a given geographic area. Each wireless network may support a particular radio access technology (RAT) and may operate on one or more frequencies. A RAT may also be referred to as a radio technology, an air interface, and/or the like. A frequency may also be referred to as a carrier, a frequency channel, and/or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, and/or the like), a mesh network, and/or the like. In this case, the UE 120 may perform scheduling operations, resource selection operations, and/or other operations described elsewhere herein as being performed by the base station 110.

As indicated above, FIG. 1 is provided as an example. Other examples may differ from what is described with regard to FIG. 1.

Figure 2:
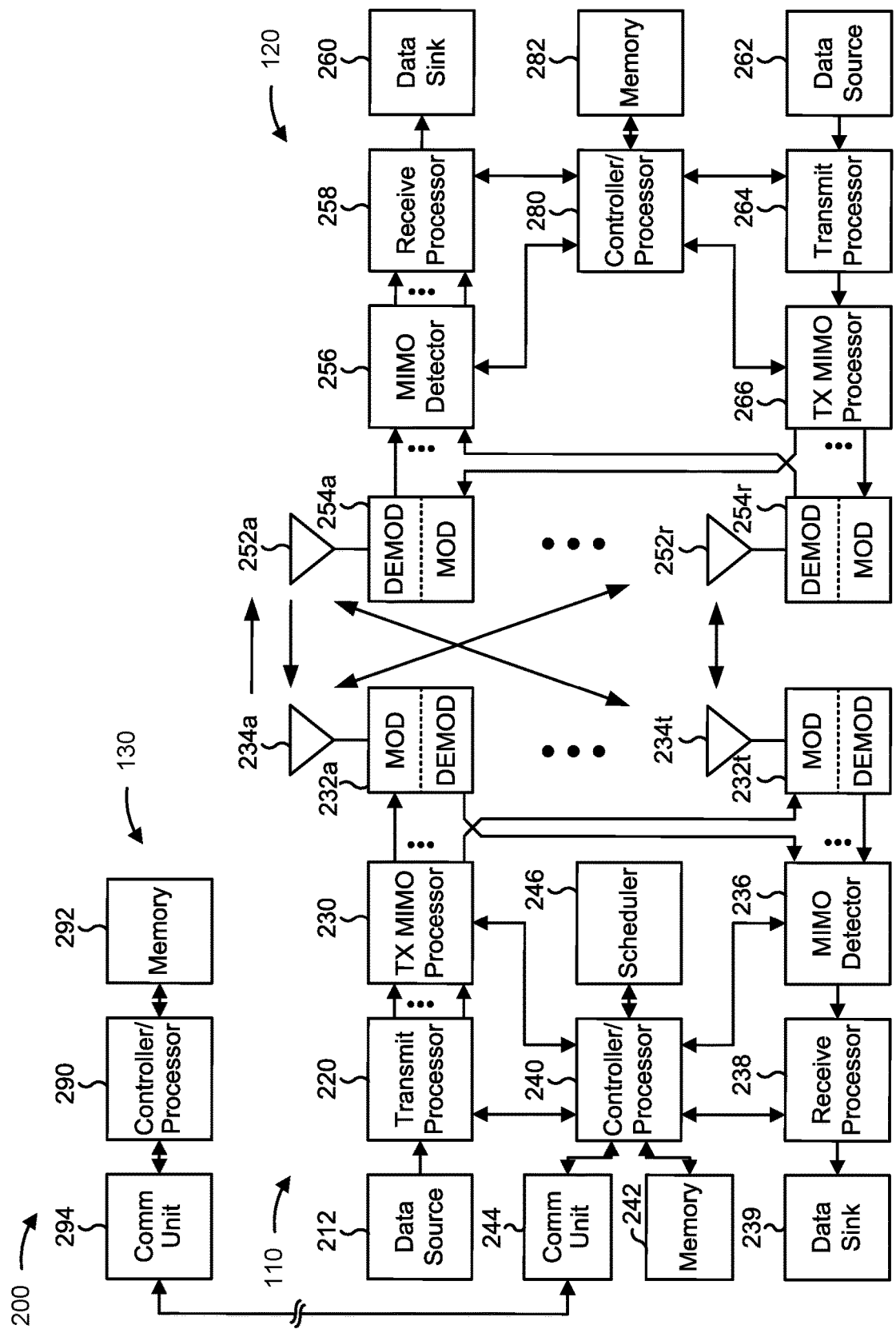
FIG. 2 is a block diagram illustrating an example of a base station in communication with a user equipment (UE) in a wireless communication network, in accordance with various aspects of the present disclosure.

FIG. 2 shows a block diagram of a design 200 of base station 110 and UE 120, which may be one of the base stations and one of the UEs in FIG. 1. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate)

the data for each UE based at least in part on the MCS(s) selected for the UE, and provide data symbols for all UEs. Transmit processor 220 may also process system information (e.g., for semi-static resource partitioning information (SRPI) and/or the like) and control information (e.g., CQI requests, grants, upper layer signaling, and/or the like) and provide overhead symbols and control symbols. Transmit processor 220 may also generate reference symbols for reference signals (e.g., the cell-specific reference signal (CRS)) and synchronization signals (e.g., the primary synchronization signal (PSS) and secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM and/or the like) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively. According to various aspects described in more detail below, the synchronization signals can be generated with location encoding to convey additional information.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM and/or the like) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. A channel processor may determine reference signal received power (RSRP), received signal strength indicator (RSSI), reference signal received quality (RSRQ), channel quality indicator (CQI), and/or the like. In some aspects, one or more components of UE 120 may be included in a housing.

On the uplink, at UE 120, a transmit processor 264 may receive and process data from a data source 262 and control information (e.g., for reports comprising RSRP, RSSI, RSRQ, CQI, and/or the like) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM, CP-OFDM, and/or the like), and transmitted to base station 110. At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Network controller 130 may include communication unit 294, controller/processor 290, and memory 292.

Controller/processor 240 of base station 110, controller/processor 280 of UE 120, and/or any other component(s) of FIG. 2 may perform one or more techniques associated with determining a duration of a resetting time period after uplink beam failure, as described in more detail elsewhere herein. For example, controller/processor 240 of base station 110, controller/processor 280 of UE 120, and/or any other component(s) of FIG. 2 may perform or direct operations of, for example, process 500 of FIG. 5, process 600 of FIG. 6, and/or other processes as described herein. Memories 242 and 282 may store data and program codes for base station 110 and UE 120, respectively. In some aspects, memory 242 and/or memory 282 may comprise a non-transitory computer-readable medium storing one or more instructions for wireless communication. For example, the one or more instructions, when executed by one or more processors of the base station 110 and/or the UE 120, may perform or direct operations of, for example, process 500 of FIG. 5, process 600 of FIG. 6, and/or other processes as described herein. A scheduler 246 may schedule UEs for data transmission on the downlink and/or uplink.

In some aspects, UE 120 may include means for detecting an uplink beam failure event for a first beam, means for reporting the uplink beam failure event, means for determining a duration of a resetting time period before communicating via a second beam, and/or the like. In some aspects, such means may include one or more components of UE 120 described in connection with FIG. 2, such as controller/processor 280, transmit processor 264, TX MIMO processor 266, MOD 254, antenna 252, DEMOD 254, MIMO detector 256, receive processor 258, and/or the like.

In some aspects, base station 110 may include means for identifying an uplink beam failure event of a first beam based at least in part on a beam failure report received from a UE; means for transmitting, to the UE, a response to the beam failure report; means for determining a duration of a resetting time period before communicating with the UE via a second beam; and/or the like. In some aspects, such means may include one or more components of base station 110 described in connection with FIG. 2, such as antenna 234, DEMOD 232, MIMO detector 236, receive processor 238, controller/processor 240, transmit processor 220, TX MIMO processor 230, MOD 232, antenna 234, and/or the like.

As indicated above, FIG. 2 is provided as an example. Other examples may differ from what is described with regard to FIG. 2.

In some wireless networks, a UE may communicate with a base station using directional beamforming to boost transmission power in one or more particular directions associated with one or more beams. By concentrating transmission power in one or more beams, an output energy associated with transmissions using the one or beams may be higher than if the UE performed an omni-directional transmission for the transmissions. This may increase a range of the transmissions, but may also cause an energy density of the transmission to satisfy (e.g., exceed) a maximum permissible exposure (MPE) that defines a highest energy density that is allowed to be exposed to a human body at close range. An MPE may be defined via radio resource control (RRC) configurations, for example, to comply with a standard and/or a regulation. The standard and/or regulation may have different limits for different frequency bandwidths. For example, a limit (e.g., corresponding to the MPE) may be lower for millimeter wave (mmWave) transmissions than for sub-6 wave transmissions.

The UE may include one or more components to detect a part of a human body and/or other organic material at close range for the UE. Based at least in part on detecting a part of a human body in a direction of a beam for which transmissions would use an energy density that satisfies the MPE, the UE may reduce transmission power of one or more antennas that are associated with the beam. However, by reducing transmission power of the one or more antennas that are associated with the beam, the transmission may not have sufficient power for the base station to receive the transmission. This may consume computing, communication, and/or network resources for the base station and the UE to determine that the power for transmissions using the beam is not sufficient for the base station to receive the transmissions and to recover from unreceived transmissions.

In some aspects described herein, a UE (e.g., UE 120) may detect an uplink beam failure event for a first beam. In some aspects, the beam failure event may be based at least in part on a determination that a communication (e.g., via an uplink transmission) via the first beam would fail to satisfy an MPE metric. The UE may report the uplink beam failure event to a base station (e.g., base station 110). In some aspects, the UE may report the uplink beam failure event via a scheduling request procedure, a random access channel (RACH) procedure, and/or the like. In some aspects, the UE may report the beam failure event by transmitting a report of the beam failure event (e.g., via another beam). The report of the beam failure event may include one or more parameters of the uplink beam failure event such as an indication of a second beam to replace the first beam, a cell identification of the first beam, an indication of an event type of the beam failure event (e.g., an MPE event), a resetting time period before communicating via the second beam, and/or the like.

In some aspects, the UE may determine the resetting time period after reporting the uplink beam failure. The UE and the base station may each determine the resetting time period based at least in part on one or more known parameters (e.g., a numerology and/or subcarrier spacing of one or more beams used for communications between the UE and the base station). In this way, the UE and the base station may be in synchronization for communication via the second beam. This may conserve computing, communication, and/or network resources that may otherwise have been used to synchronize the UE and the base station for communicating via the second beam.

Figure 3:
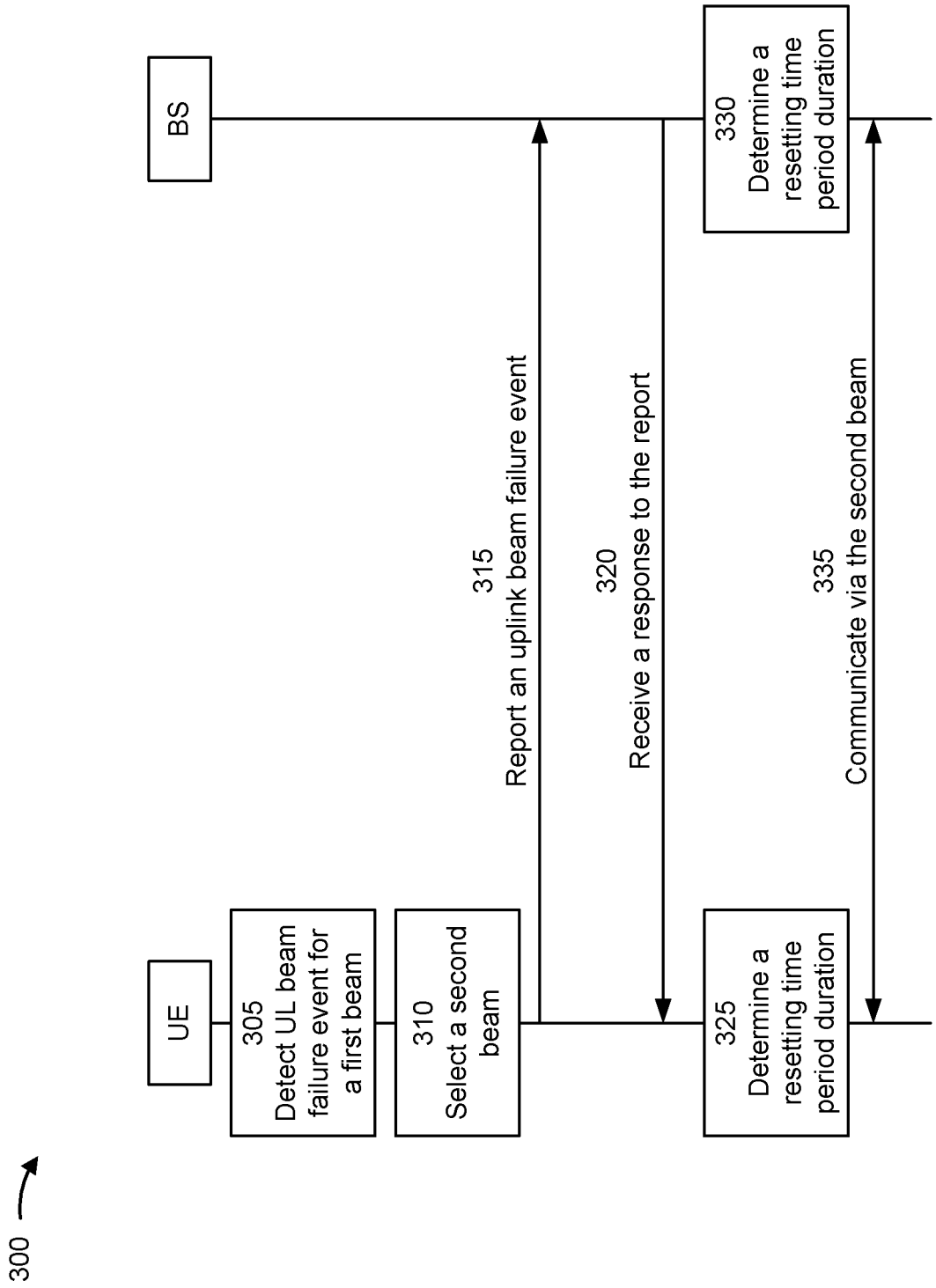
FIG. 3 is a diagram illustrating an example of determining a duration of a resetting time period after uplink beam failure, in accordance with various aspects of the present disclosure.

FIG. 3 is a diagram illustrating an example 300 of determining a duration of a resetting time period after uplink beam failure, in accordance with various aspects of the present disclosure. As shown in FIG. 3, a UE (e.g., UE 120) may communicate with a base station (e.g., base station 110) to report an uplink beam failure event for a beam (e.g., a first beam) and to begin communicating via a replacement beam (e.g., a second beam) after a resetting time period duration. The UE and the base station may be part of a wireless network (e.g., wireless network 100).

As shown in FIG. 3, and by reference number 305, a UE may detect an uplink beam failure event for the first beam. In some aspects, the beam failure event may be associated with an MPE metric. For example, the UE may determine that a communication via the first beam would fail to satisfy the MPE metric. In some aspects, the determination that the communication via the first beam would fail to satisfy the MPE metric may be based at least in part on a part of a human body moving into a transmission path of the first beam, the UE moving to cause the part of the human body to be in the transmission path of the first beam, and/or the like.

As shown by reference number 310, the UE may select the second beam to replace the first beam for communicating with the base station. In some aspects, the UE may replace the first beam with the second beam for uplink transmissions and not for downlink transmissions. In some aspects, the UE may select the second beam based at least in part on a measurement of a downlink reference signal. For example, the UE may select the second beam based at least in part on a channel state information reference signal (CSI-RS) associated with the second beam, a pathloss reference signal (PL RS) associated with the second beam, and/or the like.

In some aspects, the second beam may be a working beam at the time of detecting the uplink beam failure event for the first beam. In some aspects, the UE may select the second beam from a set of candidate working beams. For example, the UE may select the second beam based at least in part on the second beam having a highest active uplink beam identification, the second beam having a lowest active uplink beam identification, and/or the like. In some aspects, the uplink beam identification of the second beam may be based at least in part on one or more of a spatial relation information identification, a spatial relation reference signal identification, an uplink transmission configuration indicator state identification, and/or the like.

In some aspects, the UE may select the second beam based at least in part on the second beam being associated with a set of beam parameter values that are also associated with the first beam. The set of beam parameter values may correspond to a spatial relation, an uplink transmission configuration indicator state, and/or the like.

In some aspects, the UE may select a pathloss reference signal associated with the second beam and/or select power control parameters associated with the second beam. In some aspects, the power control parameters for transmitting a message using the second beam may include one or more of values for P0, alpha, a pathloss reference signal, a closed loop index, and/or a transmit power control (TPC) command. The set of power control parameters may be used in a power control formula to determine a transmission power for transmitting via the second beam. In some aspects, P0 may represent a target received power, alpha may represent a compensation factor in a power control formula, and the pathloss reference signal may indicate an amount of pathloss (e.g., an amount of signal power lost during transmission to the base station). In some aspects, the UE may identify the power control parameters based at least in part on a configuration of the UE, within a communication from the base station, and/or the like.

As shown by reference number 315, the UE may report an uplink beam failure event to the base station. In some aspects, the UE may use a scheduling request procedure (e.g., as described in relation to FIG. 4A), a RACH procedure (e.g., as described in relation to FIG. 4B), and/or the like.

In some aspects, the UE may report the uplink beam failure event by transmitting a report of the uplink beam failure event. In some aspects, the UE may transmit the report of the uplink beam failure via a third beam. The third beam may be associated with a component carrier that is different from a component carrier that is associated with the first bean. The third beam may be in a first frequency band that is different from a second frequency band of the third beam. In some aspects, the report may include an identification of the second beam, a cell identification of the first beam, an indication of an event type of the uplink beam failure event, a duration of a resetting time period, and/or the like. In some aspects, the content of the report may be configured by, for example, RRC signaling. The UE may receive the RRC signaling before detecting the uplink beam failure event.

In some aspects, the UE may identify the second beam using a downlink reference signal identification. The second beam may be a beam previously used to receive a downlink reference signal identified by the downlink reference signal identification. In some aspects, the UE may use a measurement of the downlink reference signal to determine pathloss for the second beam and/or one or more power control parameters for communicating via the second beam.

In some aspects, the UE may identify the second beam using an uplink reference signal identification. The second beam may be a beam previously used to transmit an uplink reference signal identified by the uplink reference signal identification. In some aspects, the UE may use a measurement of a pathloss reference signal associated with the uplink reference signal to determine pathloss for the second beam, and/or one or more power control parameters for communicating via the second beam.

In some aspects, the UE may identify the second beam using a candidate beam identifier associated with a candidate beam identified in an uplink beam failure recovery procedure. In some aspects, the UE may use a measurement of a reference signal associated with the second beam during the uplink beam failure recovery procedure to determine pathloss for the second beam and/or one or more power control parameters for communicating via the second beam.

In some aspects, the UE may identify the second beam using a spatial relation or an uplink transmission configuration indicator state. In some aspects, the UE may use a measurement of a downlink reference signal associated with the spatial relation to determine pathloss for the second beam and/or one or more power control parameters for communicating via the second beam. In some aspects, the UE may use a measurement of a pathloss reference signal used to determine a transmit power of an uplink reference signal associated with the spatial relation to determine pathloss for the second beam, and/or one or more power control parameters for communicating via the second beam.

In some aspects, the report of the uplink beam failure event identifies only the second beam as a replacement beam for one or more failed uplink beams. Based at least in part on the uplink beam failure identifying only the second beam as a replacement beam for multiple beams, the UE may be configured to use the second beam to replace the first beam and any other failed uplink beams identified as a failed beam in the report of the uplink beam failure event.

In some aspects, the report of the uplink beam failure may identify the first beam and a third beam as failed uplink beams. The report of the uplink beam failure may identify the second beam to replace the first beam and a fourth beam to replace the third beam.

As shown by reference number 320, the UE may receive a response to reporting the uplink beam failure event. In some aspects, the response may be an acknowledgement that the base station received the reporting of the uplink beam failure event. In some aspects, the response may indicate power control parameters to use for communicating via the second beam. In some aspects, the response may indicate the resetting time period duration and/or signal a configuration for determining the resetting time period. In some aspects, the UE may receive the response to the report via a physical downlink control channel (PDCCH), a physical random access channel (PRACH), and/or the like.

As shown by reference number 325, the UE may determine a resetting time period duration before communicating via the second beam. In some aspects, the resetting time period duration may be a time period between receiving the acknowledgment from the base station and communicating via the second beam. In some aspects, the resetting time period duration may be a time period between reporting the uplink beam failure event and communicating via the second beam.

In some aspects, the resetting time period comprises a specified number of symbols (e.g., from receiving the acknowledgement). A symbol duration associated with the specified number of symbols may be used to determine a time duration of the resetting time period. In some aspects, the symbol duration may be based at least in part on a numerology of the first beam and/or a subcarrier spacing of the first beam. In some aspects, the symbol duration may be based at least in part on a numerology of a beam used to transmit a report of the uplink beam failure event and/or a subcarrier spacing of the third beam. For example, the symbol duration may be based at least in part on a largest numerology of the first beam and the third beam, a smallest numerology of the first beam and the third beam, a largest subcarrier spacing of the first beam and the third beam, and/or a smallest subcarrier spacing of the first beam and the third beam.

In some aspects, the resetting time period may include a first number of symbols based at least in part on physical downlink control channel processing latency and a second number of symbols based at least in part on beam switching latency. The first number of symbols may be based at least in part on a numerology and/or a subcarrier spacing of a third beam used to transmit a report of the uplink beam failure event. In some aspects, the first number of symbols is to account for processing latency for processing the response to the report. The second number of symbols may be based at least in part on one or more of a numerology or a subcarrier spacing of the first beam. In some aspects, the second number of symbols is to account for beam switching latency.

In some aspects, the UE may select the duration of the resetting time period and report the duration of the resetting time period as selected and/or a time at which the UE will communicate via the second beam. In some aspects, the UE may provide, via the report of the uplink beam failure event or via additional signaling, a report of the duration of the resetting time period as selected and/or a time at which the UE will communicate via the second beam.

As shown by reference number 330, the base station may determine the resetting time period duration. In some aspects, the base station may determine the resetting time period duration based at least in part on a configuration of the UE that indicates how the UE will determine the resetting time period duration. For example, the base station may configure the UE to determine the resetting time period as a time between receiving the response to the report and communicating via the second beam. Additionally, or alternatively, the base station may configure the UE to determine the resetting time period duration using rules and/or formulas to determine the resetting time period duration, as described above. In some aspects, the base station may determine the resetting time duration based at least in part on an indication from the UE (e.g., within the report of the beam failure event).

In this way, the UE and the base station may both determine the resetting time period duration using a same set of rules and/or formulas to remain in synchronization. In this way the UE and/or the base station may conserve computing, communication, and/or networking resources that may otherwise be used to reestablish synchronization, to detect and/or recover from communication errors that are based at least in part on being out of synchronization, and/or the like.

As shown by reference number 335, the UE and the base station may communicate via the second beam. For example, the UE may transmit an uplink message to the base station via the second beam.

As indicated above, FIG. 3 is provided as an example. Other examples may differ from what is described with respect to FIG. 3.

Figure 4A:
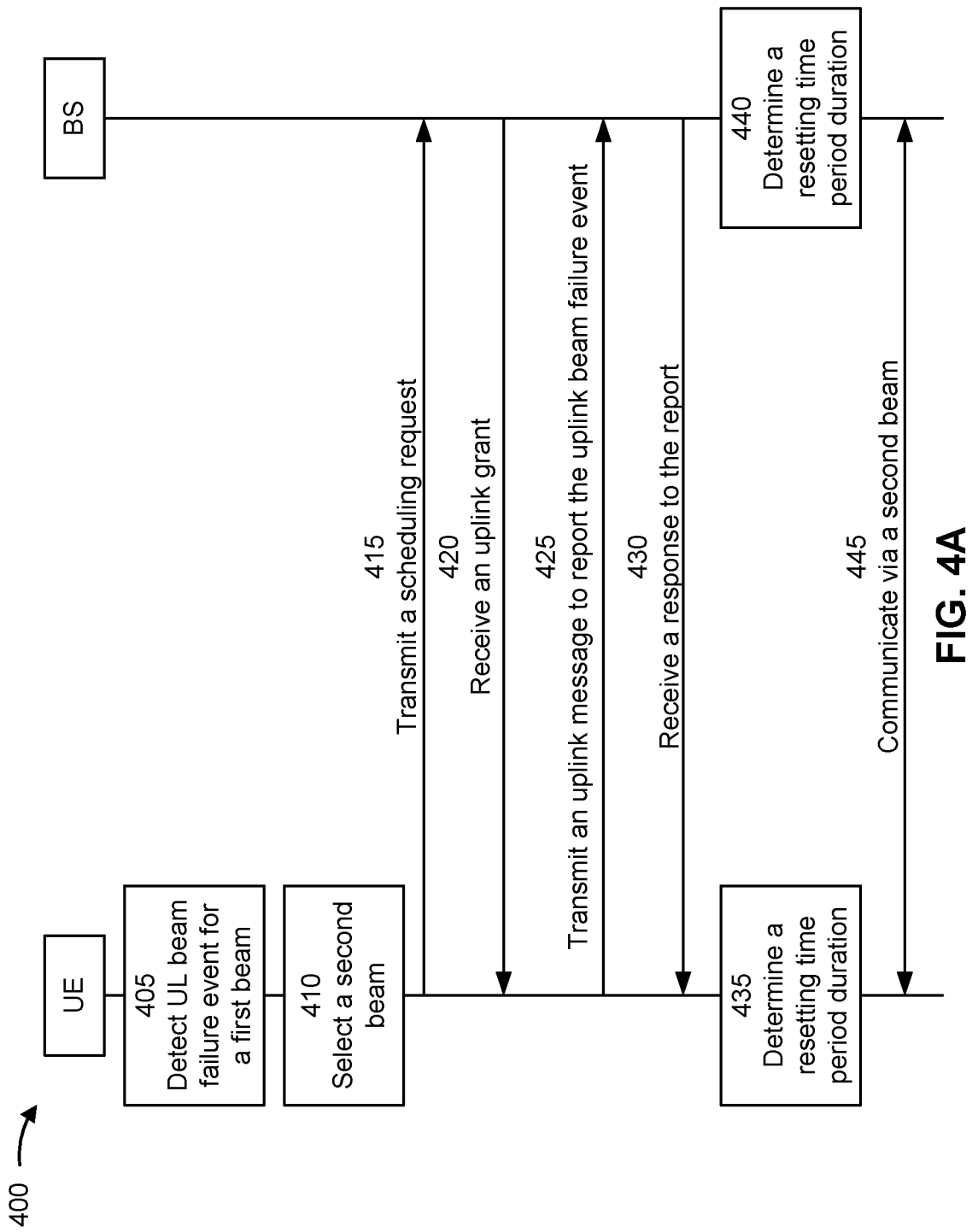
FIG. 4A is a diagram illustrating an example of determining a duration of a resetting time period after uplink beam failure, in accordance with various aspects of the present disclosure.

FIG. 4A is a diagram illustrating an example 400 of determining a duration of a resetting time period after uplink beam failure, in accordance with various aspects of the present disclosure. As shown in FIG. 4A, a UE (e.g., UE 120) communicates with a base station (e.g., base station 120) to report an uplink beam failure event for a beam (e.g., a first beam) and to begin communicating via a replacement beam (e.g., a second beam) after a resetting time period duration. The UE and the base station may be part of a wireless network (e.g., wireless network 100).

As shown by reference number 405, the UE may detect an uplink beam failure event for the first beam. The UE may detect the uplink beam failure event for the first beam as described herein (e.g., as described in relation to reference number 305).

As shown by reference number 410, the UE may select the second beam to replace the first beam for communicating with the base station. The UE may select the second beam to replace the first beam for communicating with the base station as described herein (e.g., as described in relation to reference number 310).

As shown by reference number 415, the UE may begin a scheduling request procedure by transmitting a scheduling request to the base station. In some aspects, the UE may transmit the scheduling request via a dedicated scheduling request resource. For example, the dedicated scheduling request resource may be a dedicated scheduling request resource for the UE to request a scheduling request for any purpose, for a specific purpose (e.g., to report an uplink beam failure event), and/or the like. In some aspects, the UE may transmit the scheduling request using a third beam (e.g., a working beam). The third beam may be associated with a different component carrier and/or a different frequency band than the first beam.

As shown by reference number 420, the UE may receive an uplink grant from the base station. In some aspects, the uplink grant may schedule an uplink message for the UE to transmit a report of the beam failure event. In some aspects, the uplink grant may be associated with the third beam. In some aspects, the uplink grant may include a hybrid automatic repeat request (HARQ) identification for the uplink message. In this way, the base station may prepare the UE to receive a response to the report of the beam failure event.

As shown by reference number 425, the UE may transmit an uplink message to report the uplink beam failure event. In some aspects, the uplink message may include a MAC CE message to indicate that the beam failure event has occurred. The uplink message may include a report of the uplink beam failure event including parameters of the uplink beam failure, as described herein (e.g., as described in relation to reference number 315).

As shown by reference number 430, the UE may receive a response to reporting the uplink beam failure event. In some aspects, the response may include an acknowledgement for the uplink message (e.g., based at least in part on the HARQ identification). In some aspects, the response may include a PDCCH message to schedule a new transmission via the second beam after the resetting time period. In some aspects, the response may indicate power control parameters to use for communicating via the second beam. In some aspects, the response may indicate the resetting time period duration and/or signal a configuration for determining the resetting time period.

As shown by reference number 435, the UE may determine the resetting time period duration. In some aspects, the UE may determine the resetting time period duration as described herein (e.g., as described in relation to reference number 325).

As shown by reference number 440, the base station may determine the resetting time period duration. In some aspects, the base station may determine the resetting time period duration as described herein (e.g., as described in relation to reference number 330).

As shown by reference number 445, the UE and the base station may communicate via the second beam. For example, the UE may transmit an uplink message to the base station via the second beam.

As indicated above, FIG. 4A is provided as an example. Other examples may differ from what is described with respect to FIG. 4A.

Figure 4B:
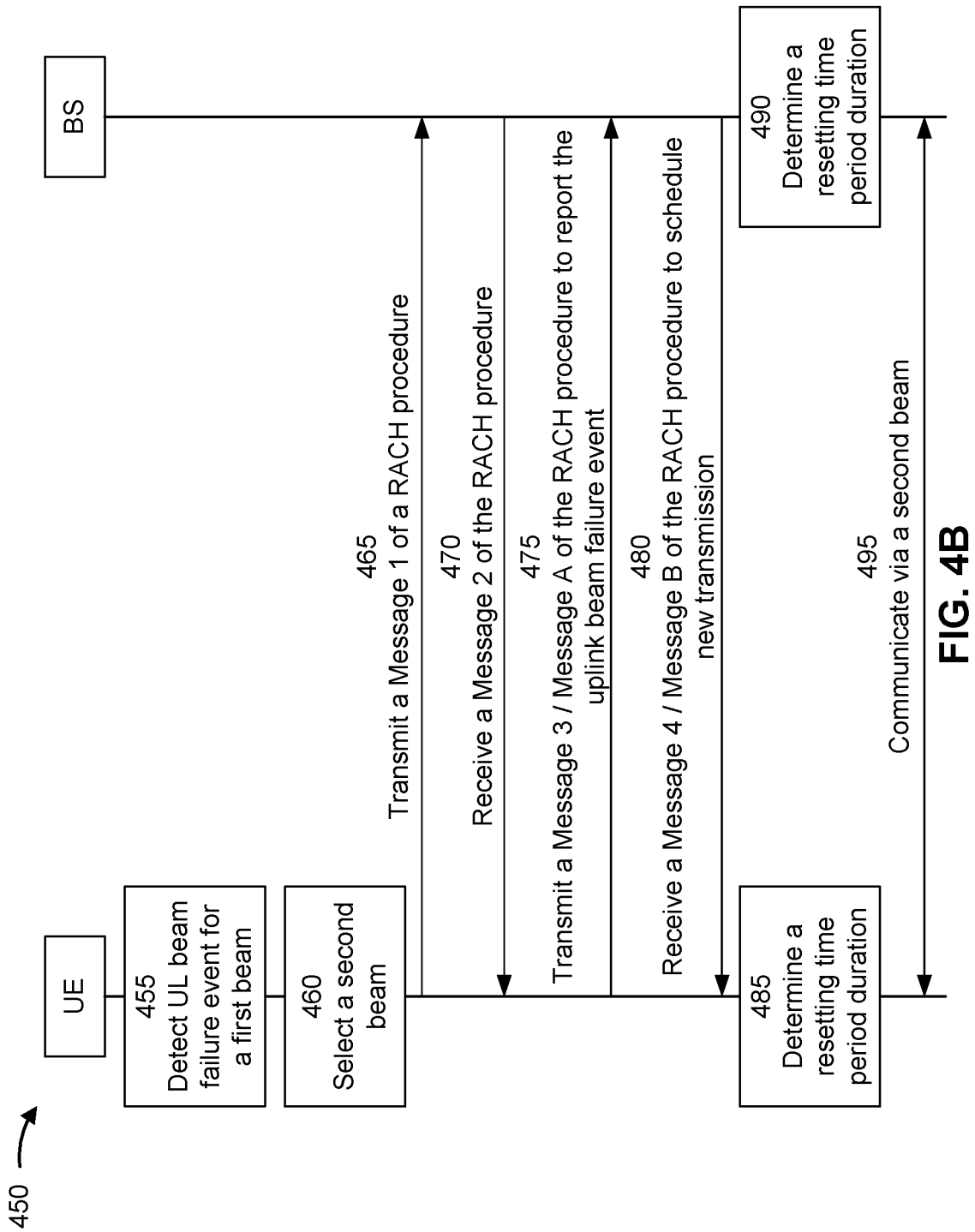
FIG. 4B is a diagram illustrating an example of determining a duration of a resetting time period after uplink beam failure, in accordance with various aspects of the present disclosure.

FIG. 4B is a diagram illustrating an example 450 of determining a duration of a resetting time period after uplink beam failure, in accordance with various aspects of the present disclosure.

As shown by reference number 455, the UE may detect an uplink beam failure event for a first beam. The UE may detect the uplink beam failure event for the first beam as described herein (e.g., as described in relation to reference number 305).

As shown by reference number 460, the UE may select a second beam to replace the first beam for communicating with the base station. The UE may select the second beam to replace the first beam for communicating with the base station as described herein (e.g., as described in relation to reference number 310). Additionally, or alternatively, the UE may select the second beam based at least in part on the second beam being a downlink beam used to receive a downlink message of a RACH procedure. In some aspects, the UE may determine that the second beam is a downlink beam used to receive a downlink message of a RACH procedure based at least in part on RRC signaling, downlink control information, and/or the like. In some aspects, the UE determines that the second beam is a downlink beam used to receive a downlink message of a RACH procedure during the RACH procedure.

In some aspects, the UE may measure a downlink reference signal associated with the RACH procedure to determine pathloss for the second beam and/or one or more power control parameters for communicating via the second beam. In some aspects, the UE may measure the downlink reference signal during the RACH procedure.

As shown by reference number 465, the UE may initiate a 4-step contention RACH procedure by transmitting a Message 1. In some aspects, the Message 1 may include a preamble for random access.

As shown by reference number 470, the UE may receive a Message 2 of the 4-step RACH procedure. In some aspects, the Message 2 may include a random access response. In some aspects, the response may acknowledge the Message 1, schedule a Message 3, and/or the like.

As shown by reference number 475, the UE may transmit a Message 3 or a Message A of the RACH procedure to report the uplink beam failure event. In some aspects, the UE may transmit the Message 3 based at least in part on the RACH procedure being a 4-step RACH procedure including the Message 1 and the Message 2. In some aspects, the UE may transmit the Message A based at least in part on the RACH procedure being a 2-step RACH procedure. The UE may be configured to use the 4-step RACH procedure or the 2-step RACH procedure based at least in part on RRC signaling.

The Message 3 or the Message A may have a sufficient payload to provide a report of the beam failure event as described herein (e.g., as described in relation to reference number 310).

As shown by reference number 480, the UE may receive a Message 4 or a Message B of the RACH procedure to schedule a new transmission. In other words, the UE may receive a response to reporting the uplink beam failure event via a subsequent downlink response in the RACH procedure (e.g., the 4-step RACH or the 2-step RACH). In some aspects, the Message 4 or Message B may include an acknowledgement that the base station received the Message 3 or Message A including the uplink beam failure event. In some aspects, the Message 4 or Message B may indicate power control parameters to use for communicating via the second beam. In some aspects, the Message 4 or Message B may indicate the resetting time period duration and/or signal a configuration for determining the resetting time period. In some aspects, the UE may receive the Message 4 or Message B via a PRACH.

As shown by reference number 485, the UE may determine the resetting time period duration. In some aspects, the UE may determine the resetting time period duration as described herein (e.g., as described in relation to reference number 325).

As shown by reference number 490, the base station may determine the resetting time period duration. In some aspects, the base station may determine the resetting time period duration as described herein (e.g., as described in relation to reference number 330).

As shown by reference number 495, the UE and the base station may communicate via the second beam. For example, the UE may transmit an uplink message to the base station via the second beam.

As indicated above, FIG. 4B is provided as an example. Other examples may differ from what is described with respect to FIG. 4B.

Figure 5:
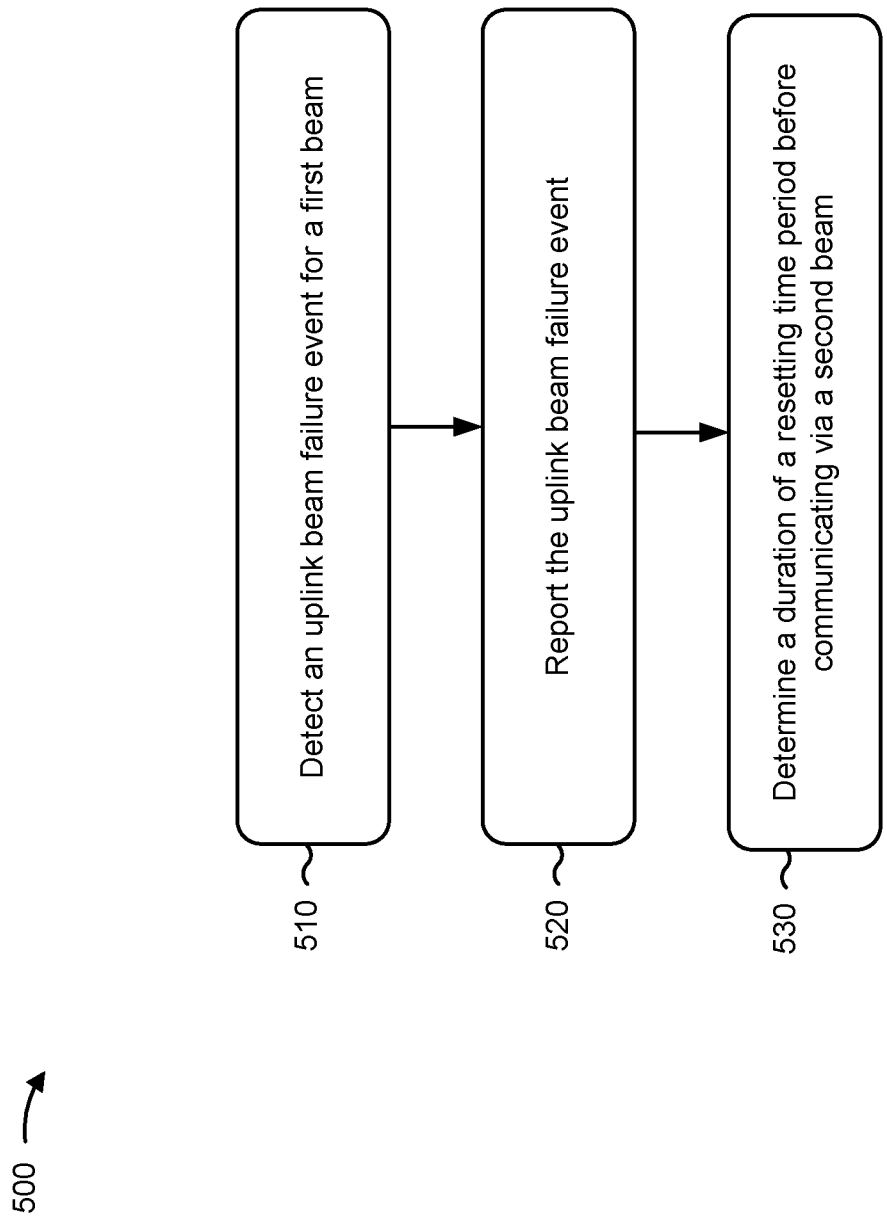
FIG. 5 is a diagram illustrating an example process performed, for example, by a UE, in accordance with various aspects of the present disclosure.

FIG. 5 is a diagram illustrating an example process 500 performed, for example, by a UE, in accordance with various aspects of the present disclosure. Example process 500 is an example where the UE (e.g., UE 120 and/or the like) performs operations associated with determining a duration of a resetting time period after uplink beam failure.

As shown in FIG. 5, in some aspects, process 500 may include detecting an uplink beam failure event for a first beam (block 510). For example, the UE (e.g., using receive processor 258, transmit processor 264, controller/processor 280, memory 282, and/or the like) may detect an uplink beam failure event for a first beam, as described above in connection with FIGS. 3, 4A, and 4B.

As further shown in FIG. 5, in some aspects, process 500 may include reporting the uplink beam failure event (block 520). For example, the UE (e.g., using receive processor 258, transmit processor 264, controller/processor 280, memory 282, and/or the like) may report the uplink beam failure event, as described above in connection with FIGS. 3, 4A, and 4B.

As further shown in FIG. 5, in some aspects, process 500 may include determining a duration of a resetting time period before communicating via a second beam (block 530). For example, the UE (e.g., using receive processor 258, transmit processor 264, controller/processor 280, memory 282, and/or the like) may determine a duration of a resetting time period before communicating via a second beam, as described above in connection with FIGS. 3, 4A, and 4B.

Process 500 may include additional aspects, such as any single aspect or any combination of aspects described below and/or in connection with one or more other processes described elsewhere herein.

In a first aspect, detecting the uplink beam failure event for the first beam includes determining that a communication via the first beam would fail to satisfy a maximum permissible exposure metric.

In a second aspect, alone or in combination with the first aspect, reporting the uplink beam failure event includes transmitting a scheduling request, receiving an uplink grant to schedule an uplink message, and transmitting the uplink message to report the uplink beam failure event.

In a third aspect, alone or in combination with one or more of the first and second aspects, the uplink message comprises a MAC CE message to indicate that the uplink beam failure event has occurred.

In a fourth aspect, alone or in combination with one or more of the first through third aspects, the uplink grant schedules the uplink message for a connected cell and includes a HARQ identification for the uplink message.

In a fifth aspect, alone or in combination with one or more of the first through fourth aspects, reporting the uplink beam failure event includes transmitting a Message 3 in a first RACH procedure, or transmitting a Message A in a second RACH procedure.

In a sixth aspect, alone or in combination with one or more of the first through fifth aspects, process 500 includes receiving a response to reporting the uplink beam failure event via a subsequent downlink response in the first RACH procedure or the second RACH procedure.

In a seventh aspect, alone or in combination with one or more of the first through sixth aspects, reporting the uplink beam failure event includes transmitting a report of the uplink beam failure event, wherein the report comprises one or more of an identification of the second beam, a cell identification of the first beam, an indication of an event type of the uplink beam failure event, or the duration of the resetting time period.

In an eighth aspect, alone or in combination with one or more of the first through seventh aspects, reporting the uplink beam failure event comprises transmitting a report of the uplink beam failure event via a third beam.

In a ninth aspect, alone or in combination with one or more of the first through eighth aspects, the first beam is associated with a first component carrier that is different from a second component carrier that is associated with the third beam.

In a tenth aspect, alone or in combination with one or more of the first through ninth aspects, the first beam is in a first frequency band that is different from a second frequency band of the third beam.

In an eleventh aspect, alone or in combination with one or more of the first through tenth aspects, process 500 includes receiving an acknowledgement associated with reporting the uplink beam failure event.

In a twelfth aspect, alone or in combination with one or more of the first through eleventh aspects, the resetting time period is a time period between receiving the acknowledgement and communicating via the second beam.

In a thirteenth aspect, alone or in combination with one or more of the first through twelfth aspects, the resetting time period includes a specified number of symbols from receiving the acknowledgement.

In a fourteenth aspect, alone or in combination with one or more of the first through thirteenth aspects, a symbol duration of the symbols is based at least in part on one or more of a numerology of the first beam, a subcarrier spacing of the first beam, a numerology of a third beam used to transmit a report of the uplink beam failure event, or a subcarrier spacing of the third beam.

In a fifteenth aspect, alone or in combination with one or more of the first through fourteenth aspects, the symbol duration is based at least in part on one or more of a largest numerology of the first beam and the third beam, a smallest numerology of the first beam and the third beam, a largest subcarrier spacing of the first beam and the third beam, or a smallest subcarrier spacing of the first beam and the third beam.

In a sixteenth aspect, alone or in combination with one or more of the first through fifteenth aspects, the resetting time period includes a first number of first symbols based at least in part on physical downlink control channel processing latency, and a second number of second symbols based at least in part on beam switching latency.

In a seventeenth aspect, alone or in combination with one or more of the first through sixteenth aspects, the first number of first symbols is based at least in part on one or more of a numerology or a subcarrier spacing of a third beam used to transmit a report of the uplink beam failure event, and the second number of second symbols is based at least in part on one or more of a numerology or a subcarrier spacing of the first beam.

In an eighteenth aspect, alone or in combination with one or more of the first through seventeenth aspects, process 500 includes selecting the duration of the resetting time period, and reporting one or more of the duration of the resetting time period or a time at which the UE will communicate via the second beam.

In a nineteenth aspect, alone or in combination with one or more of the first through eighteenth aspects, process 500 includes selecting the second beam.

In a twentieth aspect, alone or in combination with one or more of the first through nineteenth aspects, process 500 includes reporting an identification of the second beam within a report of the uplink beam failure event.

In a twenty-first aspect, alone or in combination with one or more of the first through twentieth aspects, reporting an identification of the second beam within a report of the uplink beam failure event comprises identifying the second beam using a downlink reference signal identification, and the second beam is a beam previously used to receive a downlink reference signal identified by the downlink reference signal identification.

In a twenty-second aspect, alone or in combination with one or more of the first through twenty-first aspects, process 500 includes using a measurement of the downlink reference signal to determine pathloss for the second beam.

In a twenty-third aspect, alone or in combination with one or more of the first through twenty-second aspects, reporting an identification of the second beam within a report of the uplink beam failure event comprises identifying the second beam using an uplink reference signal identification, and the second beam is a beam previously used to transmit an uplink reference signal identified by the uplink reference signal identification.

In a twenty-fourth aspect, alone or in combination with one or more of the first through twenty-third aspects, process 500 includes using measurement of a pathloss reference signal associated with the uplink reference signal to determine pathloss for the second beam.

In a twenty-fifth aspect, alone or in combination with one or more of the first through twenty-fourth aspects, reporting an identification of the second beam within a report of the uplink beam failure event comprises identifying the second beam using a candidate beam identifier associated with a candidate beam identified in an uplink beam failure recovery procedure.

In a twenty-sixth aspect, alone or in combination with one or more of the first through twenty-fifth aspects, process 500 includes using a measurement of a reference signal associated with the second beam during the uplink beam failure recovery procedure to determine pathloss for the second beam.

In a twenty-seventh aspect, alone or in combination with one or more of the first through twenty-sixth aspects, reporting an identification of the second beam within a report of the uplink beam failure event includes identifying the second beam using a spatial relation or an uplink transmission configuration indicator state.

In a twenty-eighth aspect, alone or in combination with one or more of the first through twenty-seventh aspects, process 500 includes using a measurement of a downlink reference signal associated with the spatial relation to determine pathloss for the second beam.

In a twenty-ninth aspect, alone or in combination with one or more of the first through twenty-eighth aspects, process 500 includes using, to determine pathloss for the second beam, a measurement of a pathloss reference signal used to determine a transmit power of an uplink reference signal associated with the spatial relation.

In a thirtieth aspect, alone or in combination with one or more of the first through twenty-ninth aspects, a report of the uplink beam failure event identifies only the second beam as a replacement beam for one or more failed uplink beams, and the second beam is to replace the first beam and any other failed uplink beams identified in the report of the uplink beam failure event.

In a thirty-first aspect, alone or in combination with one or more of the first through thirtieth aspects, a report of the uplink beam failure event identifies the first beam and a third beam as failed uplink beams, the report of the uplink beam failure event identifies the second beam to replace the first beam, and the report of the uplink beam failure event identifies a fourth beam to replace the third beam.

In a thirty-second aspect, alone or in combination with one or more of the first through thirty-first aspects, selecting the second beam includes selecting the second beam based at least in part on a measurement of a downlink reference signal.

In a thirty-third aspect, alone or in combination with one or more of the first through thirty-second aspects, selecting the second beam comprises identifying the second beam as a working beam.

In a thirty-fourth aspect, alone or in combination with one or more of the first through thirty-third aspects, process 500 includes selecting the second beam from a set of candidate working beams.

In a thirty-fifth aspect, alone or in combination with one or more of the first through thirty-fourth aspects, selecting the second beam from the set of candidate working beams includes selecting the second beam based at least in part on the second beam having a highest active uplink beam identification, or the second beam having a lowest active uplink beam identification.

In a thirty-sixth aspect, alone or in combination with one or more of the first through thirty-fifth aspects, an uplink beam identification of the second beam is based at least in part on one or more of a spatial relation information identification, a spatial relation reference signal identification, or an uplink transmission configuration indicator state identification.

In a thirty-seventh aspect, alone or in combination with one or more of the first through thirty-sixth aspects, reporting the uplink beam failure event includes transmitting a report of the uplink beam failure event in an uplink message of a RACH procedure, and selecting the second beam includes selecting the second beam based at least in part on the second beam being a downlink beam used to receive a downlink message of the RACH procedure.

In a thirty-eighth aspect, alone or in combination with one or more of the first through thirty-seventh aspects, process 500 includes measuring a downlink reference signal associated with the RACH procedure to determine pathloss for the second beam.

In a thirty-ninth aspect, alone or in combination with one or more of the first through thirty-eighth aspects, process 500 includes selecting a pathloss reference signal associated with the second beam, and selecting power control parameters associated with the second beam.

In a fortieth aspect, alone or in combination with one or more of the first through thirty-ninth aspects, selecting the second beam includes selecting the second beam based at least in part on the second beam being associated with a set of beam parameter values that are also associated with the first beam.

In a forty-first aspect, alone or in combination with one or more of the first through fortieth aspects, the set of beam parameter values are associated with one or more of a spatial relation or an uplink transmission configuration indicator state.

In a forty-second aspect, alone or in combination with one or more of the first through forty-first aspects, process 500 includes determining power control parameters for transmitting a message using the second beam, and the power control parameters include one or more of P0, alpha, or a close-loop index.

In a forty-third aspect, alone or in combination with one or more of the first through forty-second aspects, determining the power control parameters for transmitting the message using the second beam includes one or more of identifying the power control parameters based at least in part on a configuration of the UE, or identifying the power control parameters within a communication from a base station associated with the second beam.

In a forty-fourth aspect, alone or in combination with one or more of the first through forty-third aspects, process 500 includes transmitting a message using the second beam.

Although FIG. 5 shows example blocks of process 500, in some aspects, process 500 may include additional blocks, fewer blocks, different blocks, or differently arranged blocks than those depicted in FIG. 5. Additionally, or alternatively, two or more of the blocks of process 500 may be performed in parallel.

Figure 6:
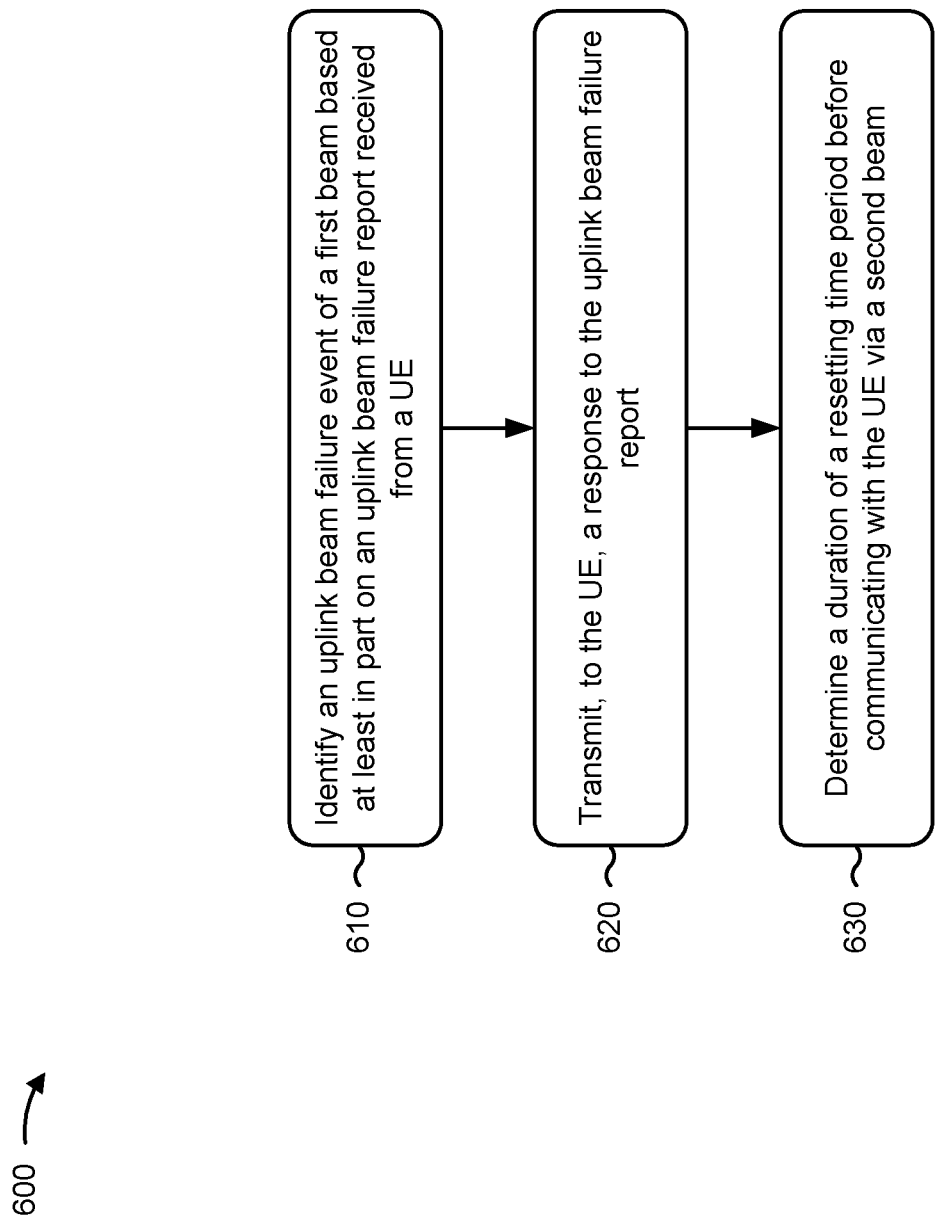
FIG. 6 is a diagram illustrating an example process performed, for example, by a base station, in accordance with various aspects of the present disclosure.

FIG. 6 is a diagram illustrating an example process 600 performed, for example, by a base station, in accordance with various aspects of the present disclosure. Example process 600 is an example where the base station (e.g., base station 110 and/or the like) performs operations associated with determining a duration of a resetting time period after uplink beam failure.

As shown in FIG. 6, in some aspects, process 600 may include identifying an uplink beam failure event of a first beam based at least in part on an uplink beam failure report received from a UE (block 610). For example, the base station (e.g., using transmit processor 220, receive processor 238, controller/processor 240, memory 242, and/or the like) may identify an uplink beam failure event of a first beam based at least in part on an uplink beam failure report received from a UE, as described above in connection with FIGS. 3, 4A, and 4B.

As further shown in FIG. 6, in some aspects, process 600 may include transmitting, to the UE, a response to the uplink beam failure report (block 620). For example, the base station (e.g., using transmit processor 220, receive processor 238, controller/processor 240, memory 242, and/or the like) may transmit, to the UE, a response to the uplink beam failure report, as described above in connection with FIGS. 3, 4A, and 4B.

As further shown in FIG. 6, in some aspects, process 600 may include determining a duration of a resetting time period before communicating with the UE via a second beam (block 630). For example, the base station (e.g., using transmit processor 220, receive processor 238, controller/processor 240, memory 242, and/or the like) may determine a duration of a resetting time period before communicating with the UE via a second beam, as described above in connection with FIGS. 3, 4A, and 4B.

Process 600 may include additional aspects, such as any single aspect or any combination of aspects described below and/or in connection with one or more other processes described elsewhere herein.

In a first aspect, process 600 includes receiving, from the UE, a message using the second beam.

In a second aspect, alone or in combination with the first aspect, process 600 includes receiving a scheduling request from the UE, transmitting an uplink grant to schedule an uplink message, and receiving the uplink message including the uplink beam failure report.

In a third aspect, alone or in combination with one or more of the first and second aspects, the uplink message comprises a MAC CE message to indicate that the uplink beam failure event has occurred.

In a fourth aspect, alone or in combination with one or more of the first through third aspects, process 600 includes receiving a Message 3, including the uplink beam failure report, in a first RACH procedure, or receiving a Message A, including the uplink beam failure report, in a second RACH procedure.

In a fifth aspect, alone or in combination with one or more of the first through fourth aspects, transmitting the response to the uplink beam failure report includes transmitting the response via a subsequent downlink response in the first random access channel procedure or the second random access channel procedure.

In a sixth aspect, alone or in combination with one or more of the first through fifth aspects, the uplink beam failure report includes one or more of an identification of the second beam, a cell identification of the first beam, an indication of an event type of the uplink beam failure event, or the duration of the resetting time period.

In a seventh aspect, alone or in combination with one or more of the first through sixth aspects, process 600 includes receiving the uplink beam failure report via a third beam.

In an eighth aspect, alone or in combination with one or more of the first through seventh aspects, the first beam is in a first component carrier that is different from a second component carrier of the third beam.

In a ninth aspect, alone or in combination with one or more of the first through eighth aspects, the first beam is in a first frequency band that is different from a second frequency band of the third beam.

In a tenth aspect, alone or in combination with one or more of the first through ninth aspects, the resetting time period is a time period between transmitting the response to the uplink beam failure event and communicating with the UE via the second beam.

In an eleventh aspect, alone or in combination with one or more of the first through tenth aspects, the resetting time period comprises a specified number of symbols from transmitting the response to the uplink beam failure event.

In a twelfth aspect, alone or in combination with one or more of the first through eleventh aspects, a symbol duration of the symbols is based at least in part on one or more of a numerology of the first beam, a subcarrier spacing of the first beam, a numerology of a third beam used to transmit a report of the uplink beam failure event, or a subcarrier spacing of the third beam.

In a thirteenth aspect, alone or in combination with one or more of the first through twelfth aspects, the symbol duration is based at least in part on one or more of a largest numerology of the first beam and the third beam, a smallest numerology of the first beam and the third beam, a largest subcarrier spacing of the first beam and the third beam, or a smallest subcarrier spacing of the first beam and the third beam.

In a fourteenth aspect, alone or in combination with one or more of the first through thirteenth aspects, the resetting time period includes a first number of first symbols based at least in part on physical downlink control channel processing latency, and a second number of second symbols based at least in part on beam switching latency.

In a fifteenth aspect, alone or in combination with one or more of the first through fourteenth aspects, the first number of first symbols is based at least in part on one or more of a numerology or a subcarrier spacing of a third beam used to transmit a report of the uplink beam failure event and the second number of second symbols is based at least in part on one or more of a numerology or a subcarrier spacing of the first beam.

In a sixteenth aspect, alone or in combination with one or more of the first through fifteenth aspects, the duration of the resetting time period is based at least in part on an identification of the duration of the resetting time period in the uplink beam failure report.

In a seventeenth aspect, alone or in combination with one or more of the first through sixteenth aspects, process 600 includes providing, to the UE, an indication of a configuration of one or more power control parameters of the UE for communicating via the second beam.

In an eighteenth aspect, alone or in combination with one or more of the first through seventeenth aspects, the uplink beam failure report includes an identification of the second beam.

Although FIG. 6 shows example blocks of process 600, in some aspects, process 600 may include additional blocks, fewer blocks, different blocks, or differently arranged blocks than those depicted in FIG. 6. Additionally, or alternatively, two or more of the blocks of process 600 may be performed in parallel.

Figure 7:
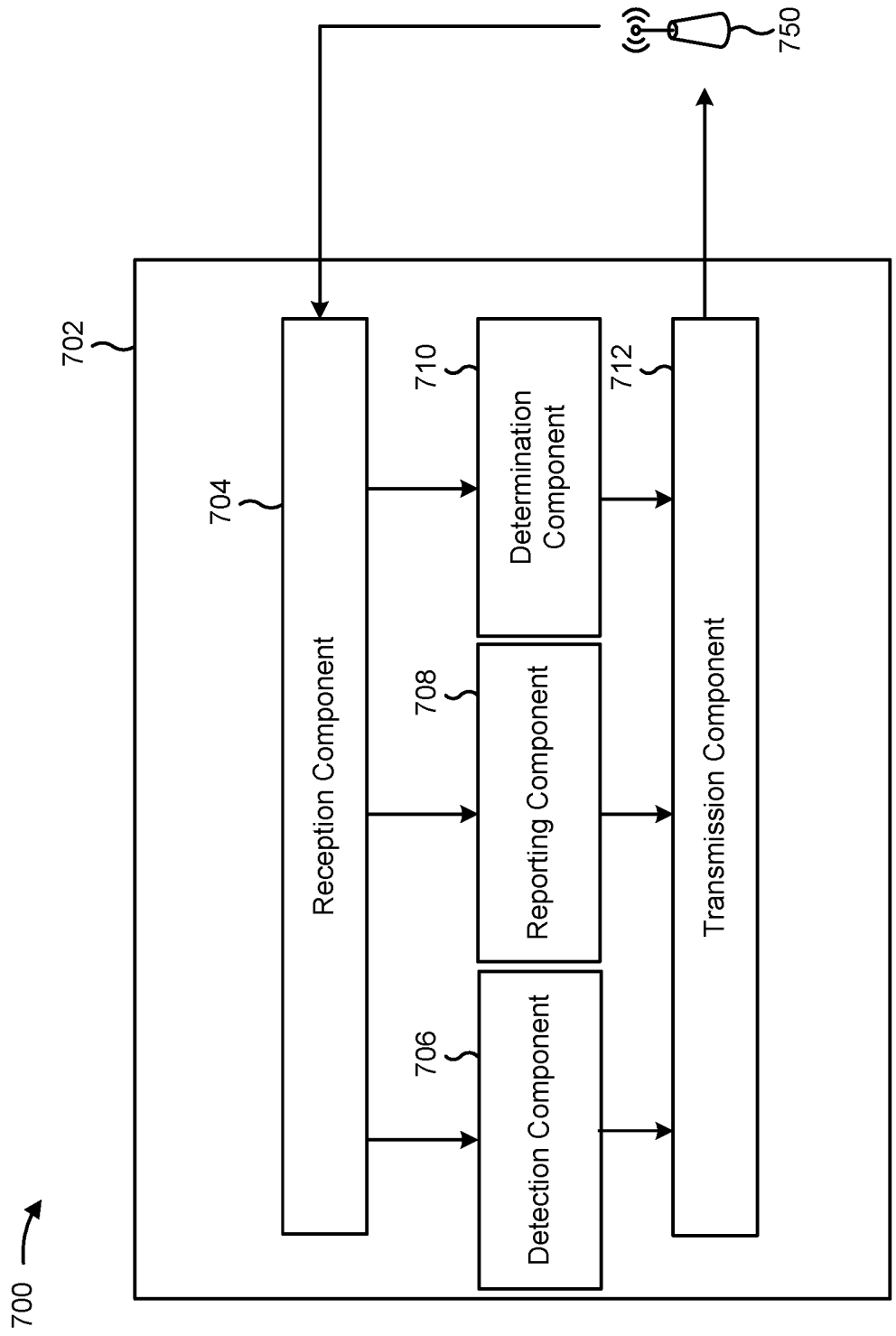
FIG. 7 is a conceptual data flow diagram illustrating an example of a data flow between different components in an example apparatus, in accordance with various aspects of the present disclosure.

FIG. 7 is a conceptual data flow diagram 700 illustrating a data flow between different components in an example apparatus 702. The apparatus 702 may be a UE (e.g., UE 120). In some aspects, the apparatus 702 includes a reception component 704, a detection component 706, a reporting component 708, a determination component 710, and/or a transmission component 712.

In some aspects, the apparatus 702 may communicate with an additional apparatus 750 (e.g., a base station) via one or more beams using the reception component 704 and the transmission component 712. The apparatus 702 may use the detection component to detect an uplink beam failure event for a first beam. For example, the detection component 704 may determine that an MPE-based uplink beam failure event has occurred. Reporting component 708 may generate a report for reporting the uplink beam failure event. For example, the reporting component 708 may determine one or more parameters to include in the report. The determining component may determine a duration of a resetting time period before communicating via a second beam.

The apparatus 702 may include additional components that perform each of the blocks of the algorithm in the aforementioned process 500 of FIG. 5 and/or the like. Each block in the aforementioned process 500 of FIG. 5 and/or the like may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

The number and arrangement of components shown in FIG. 7 are provided as an example. In practice, there may be additional components, fewer components, different components, or differently arranged components than those shown in FIG. 7. Furthermore, two or more components shown in FIG. 7 may be implemented within a single component, or a single component shown in FIG. 7 may be implemented as multiple, distributed components. Additionally, or alternatively, a set of components (e.g., one or more components) shown in FIG. 7 may perform one or more functions described as being performed by another set of components shown in FIG. 7.

Figure 8:
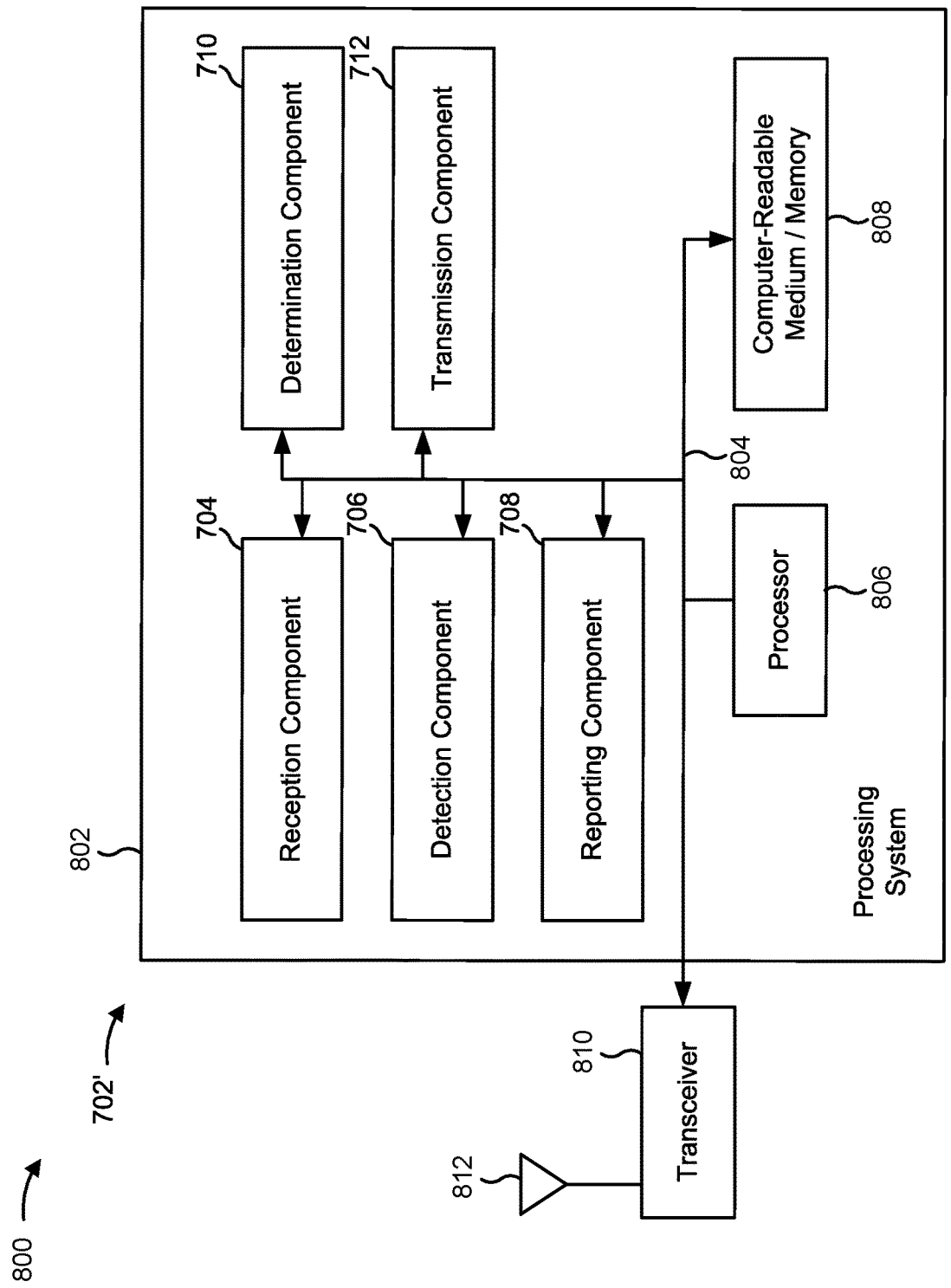
FIG. 8 is a diagram illustrating an example of a hardware implementation for an apparatus employing a processing system, in accordance with various aspects of the present disclosure.

FIG. 8 is a diagram 800 illustrating an example of a hardware implementation for an apparatus 702' employing a processing system 802. The apparatus 702' may be a UE (e.g., UE 120).

The processing system 802 may be implemented with a bus architecture, represented generally by the bus 804. The bus 804 may include any number of interconnecting buses and bridges depending on the specific application of the processing system 802 and the overall design constraints. The bus 804 links together various circuits including one or more processors and/or hardware components, represented by the processor 806, the components 704, 706, 708, 710, and/or 712, and the computer-readable medium/memory 808. The bus 804 may also link various other circuits such as timing sources, peripherals, voltage regulators, and power management circuits, which are well known in the art, and therefore will not be described any further.

The processing system 802 may be coupled to a transceiver 810. The transceiver 810 is coupled to one or more antennas 812. The transceiver 810 provides a means for communicating with various other apparatuses over a transmission medium. The transceiver 810 receives a signal from the one or more antennas 812, extracts information from the received signal, and provides the extracted information to the processing system 802, specifically the reception component 704. In addition, the transceiver 810 receives information from the processing system 802, specifically the transmission component 712, and based at least in part on the received information, generates a signal to be applied to the one or more antennas 812. The processing system 802 includes a processor 806 coupled to a computer-readable medium/memory 808. The processor 806 is responsible for general processing, including the execution of software stored on the computer-readable medium/memory 808. The software, when executed by the processor 806, causes the processing system 802 to perform the various functions described herein for any particular apparatus. The computer-readable medium/memory 808 may also be used for storing data that is manipulated by the processor 806 when executing software. The processing system further includes at least one of the components 704, 706, 708, 710, and/or 712. The components may be software modules running in the processor 806, resident/stored in the computer readable medium/memory 808, one or more hardware modules coupled to the processor 806, or some combination thereof. The processing system 802 may be a component of the UE 120 and may include the memory 282 and/or at least one of the TX MIMO processor 266, the receive (RX) processor 258, and/or the controller/processor 280.

In some aspects, the apparatus 702/702' for wireless communication includes means for detecting an uplink beam failure event for a first beam, means for reporting the uplink beam failure event, means for determining a duration of a resetting time period before communicating via a second beam, and/or the like. The aforementioned means may be one or more of the aforementioned components of the apparatus 702 and/or the processing system 802 of the apparatus 702' configured to perform the functions recited by the aforementioned means. As described elsewhere herein, the processing system 802 may include the TX MIMO processor 266, the RX processor 258, and/or the controller/processor 280. In one configuration, the aforementioned means may be the TX MIMO processor 266, the RX processor 258, and/or the controller/processor 280 configured to perform the functions and/or operations recited herein.

FIG. 8 is provided as an example. Other examples may differ from what is described in connection with FIG. 8.

Figure 9:
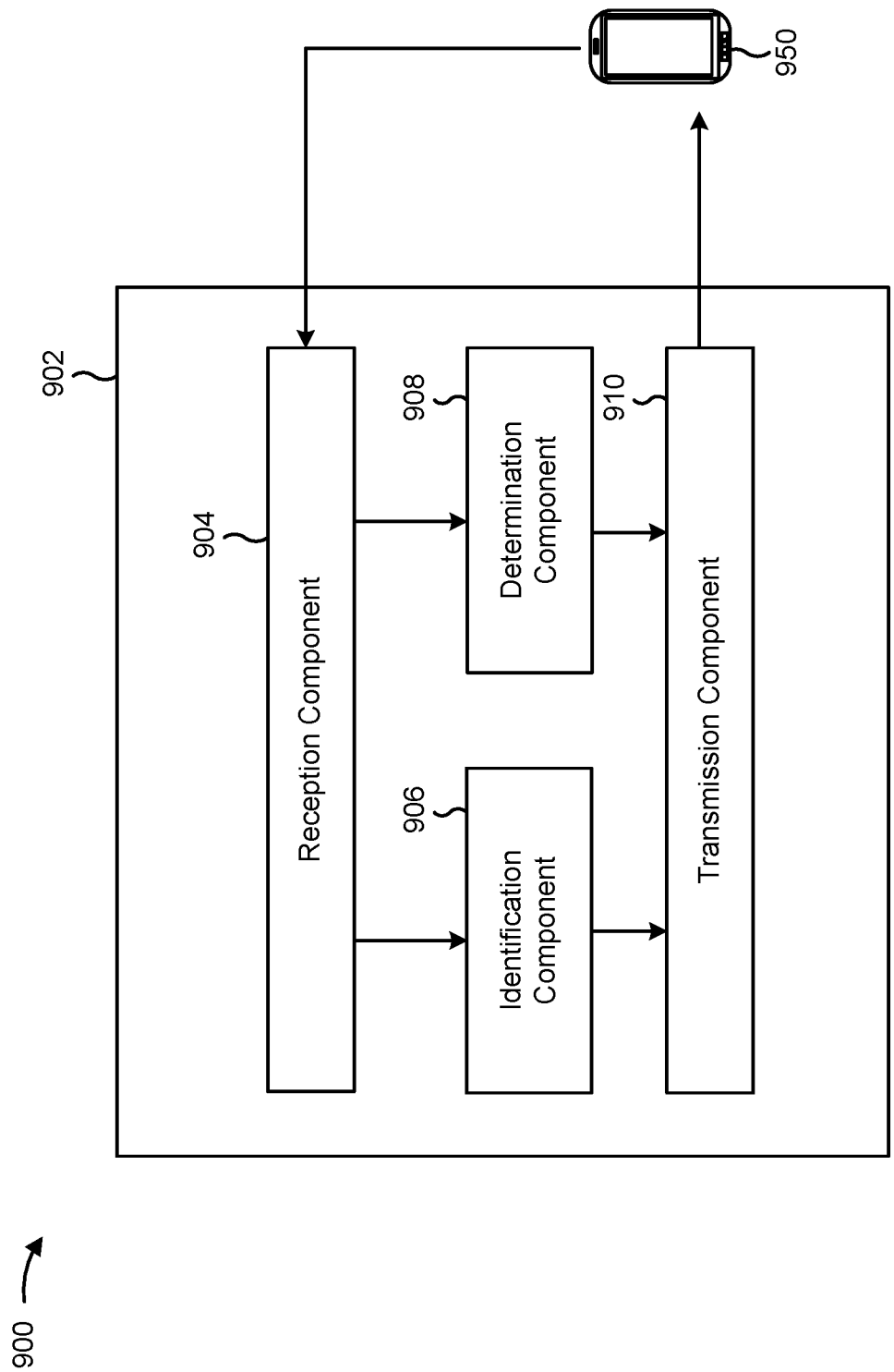
FIG. 9 is a conceptual data flow diagram illustrating an example of a data flow between different components in an example apparatus, in accordance with various aspects of the present disclosure.

FIG. 9 is a conceptual data flow diagram 900 illustrating a data flow between different components in an example apparatus 902. The apparatus 902 may be a base station (e.g., base station 110). In some aspects, the apparatus 902 includes a reception component 904, an identification component 906, a determination component 908, and/or a transmission component 910.

In some aspects, the apparatus 902 may communicate with another apparatus 950 (e.g., a UE) via one or more beams using the reception component 904 and the transmission component 910. The apparatus 902 may use the identification component 906 to identify an uplink beam failure event of a first beam based at least in part on an uplink beam failure report received from the additional apparatus 950. The apparatus 902 may use the transmission component to transmit a response to the uplink beam failure report. The apparatus 902 may use the determination component 908 to determine a duration of a resetting time period before communicating with the additional apparatus 950 via a second beam.

The apparatus 902 may include additional components that perform each of the blocks of the algorithm in the aforementioned process 600 of FIG. 6 and/or the like. Each block in the aforementioned process 600 of FIG. 6 and/or the like may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

The number and arrangement of components shown in FIG. 9 are provided as an example. In practice, there may be additional components, fewer components, different components, or differently arranged components than those shown in FIG. 9. Furthermore, two or more components shown in FIG. 9 may be implemented within a single component, or a single component shown in FIG. 9 may be implemented as multiple, distributed components. Additionally, or alternatively, a set of components (e.g., one or more components) shown in FIG. 9 may perform one or more functions described as being performed by another set of components shown in FIG. 9.

Figure 10:
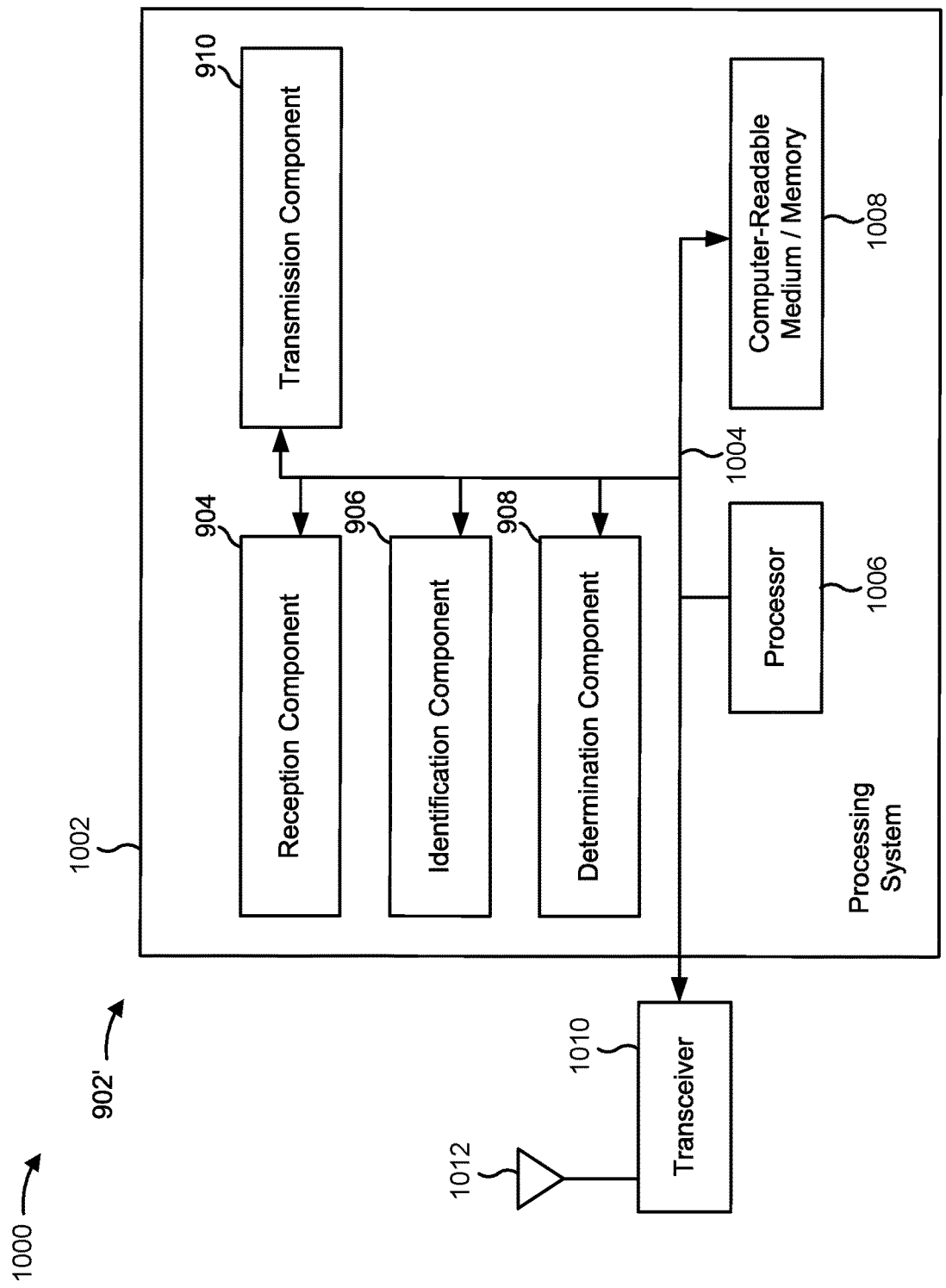
FIG. 10 is a diagram illustrating an example of a hardware implementation for an apparatus employing a processing system, in accordance with various aspects of the present disclosure.

FIG. 10 is a diagram 1000 illustrating an example of a hardware implementation for an apparatus 902' employing a processing system 1002. The apparatus 902' may be a base station (e.g., base station 110).

The processing system 1002 may be implemented with a bus architecture, represented generally by the bus 1004. The bus 1004 may include any number of interconnecting buses and bridges depending on the specific application of the processing system 1002 and the overall design constraints. The bus 1004 links together various circuits including one or more processors and/or hardware components, represented by the processor 1006, the components 904, 906, 908, and/or 910 and the computer-readable medium/memory 1008. The bus 1004 may also link various other circuits such as timing sources, peripherals, voltage regulators, and power management circuits, which are well known in the art, and therefore will not be described any further.

The processing system 1002 may be coupled to a transceiver 1010. The transceiver 1010 is coupled to one or more antennas 1012. The transceiver 1010 provides a means for communicating with various other apparatuses over a transmission medium. The transceiver 1010 receives a signal from the one or more antennas 1012, extracts information from the received signal, and provides the extracted information to the processing system 1002, specifically the reception component 904. In addition, the transceiver 1010 receives information from the processing system 1002, specifically the transmission component 910, and based at least in part on the received information, generates a signal to be applied to the one or more antennas 1012. The processing system 1002 includes a processor 1006 coupled to a computer-readable medium/memory 1008. The processor 1006 is responsible for general processing, including the execution of software stored on the computer-readable medium/memory 1008. The software, when executed by the processor 1006, causes the processing system 1002 to perform the various functions described herein for any particular apparatus. The computer-readable medium/memory 1008 may also be used for storing data that is manipulated by the processor 1006 when executing software. The processing system further includes at least one of the components 904, 906, 908, and/or 910. The components may be software modules running in the processor 1006, resident/stored in the computer readable medium/memory 1008, one or more hardware modules coupled to the processor 1006, or some combination thereof. The processing system 1002 may be a component of the base station 110 and may include the memory 242 and/or at least one of the TX MIMO processor 230, the RX processor 238, and/or the controller/processor 240.

In some aspects, the apparatus 1002/902' for wireless communication includes means for identifying an uplink beam failure event of a first beam based at least in part on an uplink beam failure report received from a UE, means for transmitting, to the UE, a response to the uplink beam failure report, means for determining a duration of a resetting time period before communicating with the UE via a second beam, and/or the like. The aforementioned means may be one or more of the aforementioned components of the apparatus 902 and/or the processing system 1002 of the apparatus 902' configured to perform the functions recited by the aforementioned means. As described elsewhere herein, the processing system 1002 may include the TX MIMO processor 230, the receive processor 238, and/or the controller/processor 240. In one configuration, the aforementioned means may be the TX MIMO processor 230, the receive processor 238, and/or the controller/processor 240 configured to perform the functions and/or operations recited herein.

FIG. 10 is provided as an example. Other examples may differ from what is described in connection with FIG. 10.

The following provides an overview of some aspects of the present disclosure:

Aspect 1: A method of wireless communication performed by a user equipment (UE), comprising: detecting an uplink beam failure event for a first beam; reporting the uplink beam failure event; and determining a duration of a resetting time period before communicating via a second beam.

Aspect 2: The method of aspect 1, wherein detecting the uplink beam failure event for the first beam comprises: determining that a communication via the first beam would fail to satisfy a maximum permissible exposure metric.

Aspect 3: The method of any of aspects 1 through 2, wherein reporting the uplink beam failure event comprises: transmitting a scheduling request; receiving an uplink grant to schedule an uplink message; and transmitting the uplink message to report the uplink beam failure event.

Aspect 4: The method of aspect 3, wherein the uplink message comprises a medium access control control element message to indicate that the uplink beam failure event has occurred.

Aspect 5: The method of any of aspects 3 or 4, wherein the uplink grant schedules the uplink message for a connected cell and includes a hybrid automatic repeat request identification for the uplink message.

Aspect 6: The method of any of aspects 1 through 5, wherein reporting the uplink beam failure event comprises: transmitting a Message 3 in a first random access channel procedure, or transmitting a Message A in a second random access channel procedure.

Aspect 7: The method of aspect 6, further comprising: receiving a response to reporting the uplink beam failure event via a subsequent downlink response in the first random access channel procedure or the second random access channel procedure.

Aspect 8: The method of any of aspects 1 through 7, wherein reporting the uplink beam failure event comprises: transmitting a report of the uplink beam failure event, wherein the report comprises one or more of: an identification of the second beam, a cell identification of the first beam, an indication of an event type of the uplink beam failure event, or the duration of the resetting time period.

Aspect 9: The method of any of aspects 1 through 8, wherein reporting the uplink beam failure event comprises: transmitting a report of the uplink beam failure event via a third beam.

Aspect 10: The method of aspect 9, wherein the first beam is associated with a first component carrier that is different from a second component carrier that is associated with the third beam.

Aspect 11: The method of any of aspects 9 or 10, wherein the first beam is in a first frequency band that is different from a second frequency band of the third beam.

Aspect 12: The method of any of aspects 1 through 11, further comprising: receiving an acknowledgement associated with reporting the uplink beam failure event.

Aspect 13: The method of aspect 12, wherein the resetting time period is a time period between receiving the acknowledgement and communicating via the second beam.

Aspect 14: The method of any of aspects 12 or 13, wherein the resetting time period comprises a specified number of symbols from receiving the acknowledgement.

Aspect 15: The method of aspect 14, wherein a symbol duration of the symbols is based at least in part on one or more of: a numerology of the first beam, a subcarrier spacing of the first beam, a numerology of a third beam used to transmit a report of the uplink beam failure event, or a subcarrier spacing of the third beam.

Aspect 16: The method of aspect 15, wherein the symbol duration is based at least in part on one or more of: a largest numerology of the first beam and the third beam, a smallest numerology of the first beam and the third beam, a largest subcarrier spacing of the first beam and the third beam, or a smallest subcarrier spacing of the first beam and the third beam.

Aspect 17: The method of aspect 12, wherein the resetting time period comprises: a first number of first symbols based at least in part on physical downlink control channel processing latency, and a second number of second symbols based at least in part on beam switching latency.

Aspect 18: The method of aspect 17, wherein the first number of first symbols is based at least in part on one or more of a numerology or a subcarrier spacing of a third beam used to transmit a report of the uplink beam failure event, and wherein the second number of second symbols is based at least in part on one or more of a numerology or a subcarrier spacing of the first beam.

Aspect 19: The method of any of aspects 1 through 18, further comprising: selecting the duration of the resetting time period; and reporting one or more of the duration of the resetting time period or a time at which the UE will communicate via the second beam.

Aspect 20: The method of any of aspects 1 through 19, further comprising selecting the second beam.

Aspect 21: The method of aspect 20, further comprising: reporting an identification of the second beam within a report of the uplink beam failure event.

Aspect 22: The method of aspect 21, wherein reporting an identification of the second beam within a report of the uplink beam failure event comprises: identifying the second beam using a downlink reference signal identification, wherein the second beam is a beam previously used to receive a downlink reference signal identified by the downlink reference signal identification.

Aspect 23: The method of aspect 22, further comprising: using a measurement of the downlink reference signal to determine pathloss for the second beam.

Aspect 24: The method of any of aspects 21 through 23, wherein reporting an identification of the second beam within a report of the uplink beam failure event comprises: identifying the second beam using an uplink reference signal identification, wherein the second beam is a beam previously used to transmit an uplink reference signal identified by the uplink reference signal identification.

Aspect 25: The method of aspect 24, further comprising: using measurement of a pathloss reference signal associated with the uplink reference signal to determine pathloss for the second beam.

Aspect 26: The method of any of aspects 21 through 25, wherein reporting an identification of the second beam within a report of the uplink beam failure event comprises: identifying the second beam using a candidate beam identifier associated with a candidate beam identified in an uplink beam failure recovery procedure.

Aspect 27: The method of aspect 26, further comprising: using a measurement of a reference signal associated with the second beam during the uplink beam failure recovery procedure to determine pathloss for the second beam.

Aspect 28: The method of any of aspects 21 through 27, wherein reporting an identification of the second beam within a report of the uplink beam failure event comprises: identifying the second beam using a spatial relation or an uplink transmission configuration indicator state.

Aspect 29: The method of aspect 28, further comprising: using a measurement of a downlink reference signal associated with the spatial relation to determine pathloss for the second beam.

Aspect 30: The method of any of aspects 28 through 29, further comprising: using, to determine pathloss for the second beam, a measurement of a pathloss reference signal used to determine a transmit power of an uplink reference signal associated with the spatial relation.

Aspect 31: The method of any of aspects 21 through 30, wherein a report of the uplink beam failure event identifies only the second beam as a replacement beam for one or more failed uplink beams, and wherein the second beam is to replace the first beam and any other failed uplink beams identified in the report of the uplink beam failure event.

Aspect 32: The method of any of aspects 21 through 31, wherein a report of the uplink beam failure event identifies the first beam and a third beam as failed uplink beams, wherein the report of the uplink beam failure event identifies the second beam to replace the first beam, and wherein the report of the uplink beam failure event identifies a fourth beam to replace the third beam.

Aspect 33: The method of any of aspects 20 through 32, wherein selecting the second beam comprises: selecting the second beam based at least in part on a measurement of a downlink reference signal.

Aspect 34: The method of any of aspects 20 through 33, wherein selecting the second beam comprises identifying the second beam as a working beam.

Aspect 35: The method of aspect 34, further comprising: selecting the second beam from a set of candidate working beams.

Aspect 36: The method of aspect 35, wherein selecting the second beam from the set of candidate working beams comprises: selecting the second beam based at least in part on: the second beam having a highest active uplink beam identification, or the second beam having a lowest active uplink beam identification.

Aspect 37: The method of aspect 36, wherein an uplink beam identification of the second beam is based at least in part on one or more of: a spatial relation information identification, a spatial relation reference signal identification, or an uplink transmission configuration indicator state identification.

Aspect 38: The method of any of aspects 20 through 37, wherein reporting the uplink beam failure event comprises: transmitting a report of the uplink beam failure event in an uplink message of a random access channel procedure, and wherein selecting the second beam comprises: selecting the second beam based at least in part on the second beam being a downlink beam used to receive a downlink message of the random access channel procedure.

Aspect 39: The method of aspect 38, further comprising: measuring a downlink reference signal associated with the random access channel procedure to determine pathloss for the second beam.

Aspect 40: The method of any of aspects 20 through 39, further comprising: selecting a pathloss reference signal associated with the second beam; and selecting power control parameters associated with the second beam.

Aspect 41: The method of any of aspects 1 through 40, wherein selecting the second beam comprises: selecting the second beam based at least in part on the second beam being associated with a set of beam parameter values that are also associated with the first beam.

Aspect 42: The method of aspect 41, wherein the set of beam parameter values are associated with one or more of a spatial relation or an uplink transmission configuration indicator state.

Aspect 43: The method of any of aspects 1 through 42, further comprising: determining power control parameters for transmitting a message using the second beam, wherein the power control parameters comprise one or more of P0, alpha, or a close-loop index.

Aspect 44: The method of aspect 43, wherein determining the power control parameters for transmitting the message using the second beam comprises one or more of: identifying the power control parameters based at least in part on a configuration of the UE, or identifying the power control parameters within a communication from a base station associated with the second beam.

Aspect 45: The method of any of aspects 1 through 44, further comprising: transmitting a message using the second beam.

Aspect 46: A method of wireless communication performed by a base station, comprising: identifying an uplink beam failure event of a first beam based at least in part on an uplink beam failure report received from a user equipment (UE); transmitting, to the UE, a response to the uplink beam failure report; and determining a duration of a resetting time period before communicating with the UE via a second beam.

Aspect 47: The method of aspect 46, further comprising: receiving, from the UE, a message using the second beam.

Aspect 48: The method of any of aspects 46 through 47, further comprising: receiving a scheduling request from the UE; transmitting an uplink grant to schedule an uplink message; and receiving the uplink message including the uplink beam failure report.

Aspect 49: The method of aspect 48, wherein the uplink message comprises a medium access control control element message to indicate that the uplink beam failure event has occurred.

Aspect 50: The method of any of aspects 46 through 49, further comprising: receiving a Message 3, including the uplink beam failure report, in a first random access channel procedure, or receiving a Message A, including the uplink beam failure report, in a second random access channel procedure.

Aspect 51: The method of aspect 50, wherein transmitting the response to the uplink beam failure report comprises: transmitting the response via a subsequent downlink response in the first random access channel procedure or the second random access channel procedure.

Aspect 52: The method of any of aspects 46 through 51, wherein the uplink beam failure report comprises one or more of: an identification of the second beam, a cell identification of the first beam, an indication of an event type of the uplink beam failure event, or the duration of the resetting time period.

Aspect 53: The method of any of aspects 46 through 52, further comprising: receiving the uplink beam failure report via a third beam.

Aspect 54: The method of aspect 53, wherein the first beam is in a first component carrier that is different from a second component carrier of the third beam.

Aspect 55: The method of any of aspects 53 through 54, wherein the first beam is in a first frequency band that is different from a second frequency band of the third beam.

Aspect 56: The method of any of aspects 46 through 55, wherein the resetting time period is a time period between transmitting the response to the uplink beam failure event and communicating with the UE via the second beam.

Aspect 57: The method of aspect 56, wherein the resetting time period comprises a specified number of symbols from transmitting the response to the uplink beam failure event.

Aspect 58: The method of aspect 57, wherein a symbol duration of the symbols is based at least in part on one or more of: a numerology of the first beam, a subcarrier spacing of the first beam, a numerology of a third beam used to transmit a report of the uplink beam failure event, or a subcarrier spacing of the third beam.

Aspect 59: The method of aspect 58, wherein the symbol duration is based at least in part on one or more of: a largest numerology of the first beam and the third beam, a smallest numerology of the first beam and the third beam, a largest subcarrier spacing of the first beam and the third beam, or a smallest subcarrier spacing of the first beam and the third beam.

Aspect 60: The method of any of aspects 46 through 59, wherein the resetting time period comprises: a first number of first symbols based at least in part on physical downlink control channel processing latency, and a second number of second symbols based at least in part on beam switching latency.

Aspect 61: The method of aspect 60, wherein the first number of first symbols is based at least in part on one or more of a numerology or a subcarrier spacing of a third beam used to transmit a report of the uplink beam failure event, and wherein the second number of second symbols is based at least in part on one or more of a numerology or a subcarrier spacing of the first beam.

Aspect 62: The method of any of aspects 46 through 61, wherein the duration of the resetting time period is based at least in part on an identification of the duration of the resetting time period in the uplink beam failure report.

Aspect 63: The method of any of aspects 46 through 62, further comprising: providing, to the UE, an indication of a configuration of one or more power control parameters of the UE for communicating via the second beam.

Aspect 64: The method of any of aspects 46 through 63, wherein the uplink beam failure report includes an identification of the second beam.

Aspect 65: An apparatus for wireless communication at a device, comprising a processor; memory coupled with the processor; and instructions stored in the memory and executable by the processor to cause the apparatus to perform the method of one or more aspects of aspects 1-64.

Aspect 66: A device for wireless communication, comprising a memory and one or more processors coupled to the memory, the memory and the one or more processors configured to perform the method of one or more aspects of aspects 1-64.

Aspect 67: An apparatus for wireless communication, comprising at least one means for performing the method of one or more aspects of aspects 1-64.

Aspect 68: A non-transitory computer-readable medium storing code for wireless communication, the code comprising instructions executable by a processor to perform the method of one or more aspects of aspects 1-64.

Aspect 69: A non-transitory computer-readable medium storing a set of instructions for wireless communication, the set of instructions comprising one or more instructions that, when executed by one or more processors of a device, cause the device to perform the method of one or more aspects of aspects 1-64.

Aspect 70: A method of wireless communication performed by a user equipment (UE), comprising: detecting an uplink beam failure event for a first beam; reporting the uplink beam failure event; and determining a duration of a resetting time period before communicating via a second beam.

Aspect 71: The method of aspect 70, wherein detecting the uplink beam failure event for the first beam comprises: determining that a communication via the first beam would fail to satisfy a maximum permissible exposure metric.

Aspect 72: The method of any of aspects 70 through 71, wherein reporting the uplink beam failure event comprises: transmitting a scheduling request; receiving an uplink grant to schedule an uplink message; and transmitting the uplink message to report the uplink beam failure event.

Aspect 73: The method any of aspects 70 through 72, wherein reporting the uplink beam failure event comprises: transmitting a report of the uplink beam failure event, wherein the report comprises one or more of: an identification of the second beam, a cell identification of the first beam, an indication of an event type of the uplink beam failure event, or the duration of the resetting time period.

Aspect 74: The method of any of aspects 70 through 73, wherein reporting the uplink beam failure event comprises transmitting a report of the uplink beam failure event via a third beam, wherein the first beam is associated with a first component carrier that is different from a second component carrier that is associated with the third beam, wherein the first beam is in a first frequency band that is different from a second frequency band of the third beam, or a combination thereof.

Aspect 75: The method of any of aspects 70 through 75, further comprising: receiving an acknowledgement associated with reporting the uplink beam failure event, wherein the resetting time period is a time period between receiving the acknowledgement and communicating via the second beam.

Aspect 76: The method of aspect 75, wherein the resetting time period comprises a specified number of symbols from receiving the acknowledgement, and wherein a symbol duration of the symbols is based at least in part on one or more of: a numerology of the first beam, a subcarrier spacing of the first beam, a numerology of a third beam used to transmit a report of the uplink beam failure event, or a subcarrier spacing of the third beam.

Aspect 77: The method of any of aspects 75 through 76, wherein the resetting time period comprises: a first number of first symbols based at least in part on physical downlink control channel processing latency, and a second number of second symbols based at least in part on beam switching latency, wherein the first number of first symbols is based at least in part on one or more of a numerology or a subcarrier spacing of a third beam used to transmit a report of the uplink beam failure event, and wherein the second number of second symbols is based at least in part on one or more of a numerology or a subcarrier spacing of the first beam.

Aspect 78: The method of any of aspects 70 through 78, further comprising: identifying the second beam as a working beam; and selecting the second beam from a set of candidate working beams.

Aspect 79: The method of aspect 78, wherein selecting the second beam from the set of candidate working beams comprises: selecting the second beam based at least in part on: the second beam having a highest active uplink beam identification, or the second beam having a lowest active uplink beam identification.

Aspect 80: The method of any of aspects 70 through 80, further comprising: selecting the second beam based at least in part on the second beam being associated with a set of beam parameter values that are also associated with the first beam.

Aspect 81: The method of aspect 80, wherein the set of beam parameter values are associated with one or more of a spatial relation or an uplink transmission configuration indicator state.

Aspect 82: An apparatus for wireless communication at a device, comprising a processor; memory coupled with the processor; and instructions stored in the memory and executable by the processor to cause the apparatus to perform the method of one or more aspects of aspects 70-81.

Aspect 83: A device for wireless communication, comprising a memory and one or more processors coupled to the memory, the memory and the one or more processors configured to perform the method of one or more aspects of aspects 70-81.

Aspect 84: An apparatus for wireless communication, comprising at least one means for performing the method of one or more aspects of aspects 70-81.

Aspect 85: A non-transitory computer-readable medium storing code for wireless communication, the code comprising instructions executable by a processor to perform the method of one or more aspects of aspects 70-81.

Aspect 86: A non-transitory computer-readable medium storing a set of instructions for wireless communication, the set of instructions comprising one or more instructions that, when executed by one or more processors of a device, cause the device to perform the method of one or more aspects of aspects 70-81.

The foregoing disclosure provides illustration and description, but is not intended to be exhaustive or to limit the aspects to the precise form disclosed. Modifications and variations may be made in light of the above disclosure or may be acquired from practice of the aspects.

As used herein, the term "component" is intended to be broadly construed as hardware, firmware, and/or a combination of hardware and software. As used herein, a processor is implemented in hardware, firmware, and/or a combination of hardware and software.

As used herein, satisfying a threshold may, depending on the context, refer to a value being greater than the threshold, greater than or equal to the threshold, less than the threshold, less than or equal to the threshold, equal to the threshold, not equal to the threshold, and/or the like.

It will be apparent that systems and/or methods described herein may be implemented in different forms of hardware, firmware, and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. A phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items, and may be used interchangeably with "one or more." Furthermore, as used herein, the terms "set" and "group" are intended to include one or more items (e.g., related items, unrelated items, a combination of related and unrelated items, and/or the like), and may be used interchangeably with "one or more." Where only one item is intended, the phrase "only one" or similar language is used. Also, as used herein, the terms "has," "have," "having," and/or the like are intended to be open-ended terms. Further, the phrase "based on" is intended to mean "based, at least in part, on" unless explicitly stated otherwise.

What is claimed is:

1. A method of wireless communication performed by a user equipment (UE), comprising:
    detecting an uplink beam failure event for a first beam associated with a first component carrier;
    reporting, via a second beam associated with a second component carrier that is different from the first component carrier, the uplink beam failure event,
        wherein the first beam is in a first frequency band that is different from a second frequency band of the second beam; and
    communicating via a third beam associated with a third component carrier that is different from the first component carrier based at least in part on an expiration of a resetting time period, wherein the third beam is in a third frequency band that is different from the first frequency band, wherein the resetting time period comprises a specified number of symbols, wherein a time duration of the resetting time period is determined based at least in part on a symbol duration associated with the specified number of symbols, and wherein a response associated with reporting the uplink beam failure event configures the UE to determine a start of a duration of the resetting time period as corresponding to a time at which the response associated with reporting the uplink beam failure event is received.

2. The method of claim 1, wherein detecting the uplink beam failure event for the first beam comprises:

determining that a communication via the first beam would fail to satisfy a maximum permissible exposure metric, and wherein communicating via the third beam comprises:

communicating one or more uplink communications via the third beam based at least in part on the expiration of the resetting time period, wherein the first beam is utilized for one or more downlink communications.

3. The method of claim 1, wherein reporting the uplink beam failure event comprises:

transmitting a scheduling request;

receiving an uplink grant to schedule an uplink message; and transmitting the uplink message to report the uplink beam failure event.

4. The method of claim 1, wherein reporting the uplink beam failure event comprises:

transmitting a report of the uplink beam failure event, wherein the report comprises one or more of:

an identification of the third beam, a cell identification of the first beam, or an indication of an event type of the uplink beam failure event.

5. The method of claim 1, wherein the symbol duration associated with the specified number of symbols, is based at least in part on one or more of:

a numerology of the first beam, a subcarrier spacing of the first beam, a numerology of the second beam, or a subcarrier spacing of the second beam.

6. The method of claim 1, wherein the resetting time period comprises:

a first number of first symbols based at least in part on physical downlink control channel processing latency, and a second number of second symbols based at least in part on beam switching latency, wherein the first number of first symbols is based at least in part on one or more of a numerology or a subcarrier spacing of the second beam, and wherein the second number of second symbols is based at least in part on one or more of a numerology or a subcarrier spacing of the first beam.

7. The method of claim 1, further comprising:

identifying the third beam as a working beam; and selecting the third beam from a set of candidate working beams.

8. The method of claim 7, A wherein selecting the third beam from the set of candidate working beams comprises:

selecting the third beam based at least in part on:

the third beam having a highest active uplink beam identification, or the third beam having a lowest active uplink beam identification.

9. The method of claim 1, further comprising:

selecting the third beam based at least in part on the third beam being associated with a set of beam parameter values that are also associated with the first beam.

10. The method of claim 9, wherein the set of beam parameter values are associated with one or more of a spatial relation or an uplink transmission configuration indicator state.

11. A user equipment (UE) for wireless communication, comprising:

memory; and one or more processors coupled to the memory, the one or more processors configured to:

detect an uplink beam failure event for a first beam associated with a first component carrier;

report, via a second beam associated with a second component carrier that is different from the first component carrier, the uplink beam failure event, wherein the first beam is in a first frequency band that is different from a second frequency band of the second beam; and communicate via a third beam associated with a third component carrier that is different from the first component carrier based at least in part on an expiration of a resetting time period, wherein the third beam is in a third frequency band that is different from the first frequency band, wherein the resetting time period comprises a specified number of symbols, wherein a time duration of the resetting time period is determined based at least in part on a symbol duration associated with the specified number of symbols, and wherein a response associated with reporting the uplink beam failure event configures the UE to determine a start of a duration of the resetting time period as corresponding to a time at which the response associated with reporting the uplink beam failure event is received.

12. The UE of claim 11, wherein the one or more processors, when detecting the uplink beam failure event for the first beam, are configured to:

determine that a communication via the first beam would fail to satisfy a maximum permissible exposure metric.

13. The UE of claim 11, wherein the one or more processors, when reporting the uplink beam failure event, are configured to:

transmit a scheduling request;

receive an uplink grant to schedule an uplink message; and transmit the uplink message to report the uplink beam failure event.

14. The UE of claim 11, wherein the one or more processors, when reporting the uplink beam failure event, are configured to:

transmit a report of the uplink beam failure event, wherein the report comprises one or more of:

an identification of the third beam, a cell identification of the first beam, or an indication of an event type of the uplink beam failure event.

15. The UE of claim 11, wherein the symbol duration associated with the specified number of symbols, is based at least in part on one or more of:
a numerology of the first beam,
a subcarrier spacing of the first beam,
a numerology of the second beam, or
a subcarrier spacing of the second beam.

16. The UE of claim 11, wherein the resetting time period comprises:
a first number of first symbols based at least in part on physical downlink control channel processing latency, and
a second number of second symbols based at least in part on beam switching latency,
wherein the first number of first symbols is based at least in part on one or more of a numerology or a subcarrier spacing of the second beam, and
wherein the second number of second symbols is based at least in part on one or more of a numerology or a subcarrier spacing of the first beam.

17. The UE of claim 11, wherein the one or more processors are further configured to:
identify the third beam as a working beam; and
select the third beam from a set of candidate working beams.

18. The UE of claim 17, wherein the one or more processors, when selecting the third beam from the set of candidate working beams, are configured to:
select the third beam based at least in part on:
the third beam having a highest active uplink beam identification, or
the third beam having a lowest active uplink beam identification.

19. The UE of claim 11, wherein the one or more processors are further configured to:
select the third beam based at least in part on the third beam being associated with a set of beam parameter values that are also associated with the first beam.

20. The UE of claim 19, wherein the set of beam parameter values are associated with one or more of a spatial relation or an uplink transmission configuration indicator state.

21. A non-transitory computer-readable medium storing a set of instructions for wireless communication, the set of instructions comprising:
one or more instructions that, when executed by one or more processors of a user equipment (UE), cause the UE to:
detect an uplink beam failure event for a first beam associated with a first component carrier;
report, via a second beam associated with a second component carrier that is different from the first component carrier, the uplink beam failure event,
wherein the first beam is in a first frequency band that is different from a second frequency band of the second beam; and
communicate via a third beam associated with a third component carrier that is different from the first component carrier based at least in part on an expiration of a resetting time period,
wherein the third beam is in a third frequency band that is different from the first frequency band,
wherein the resetting time period comprises a specified number of symbols,
wherein a time duration of the resetting time period is determined based at least in part on a symbol duration associated with the specified number of symbols, and
wherein a response associated with reporting the uplink beam failure event configures the UE to determine a start of a duration of the resetting time period as corresponding to a time at which the response associated with reporting the uplink beam failure event is received.

22. The non-transitory computer-readable medium of claim 21, wherein the one or more instructions, that cause the UE to detect the uplink beam failure event for the first beam, cause the UE to:
determine that a communication via the first beam would fail to satisfy a maximum permissible exposure metric.

23. The non-transitory computer-readable medium of claim 21, wherein the one or more instructions, that cause the UE to report the uplink beam failure event, cause the UE to:
transmit a report of the uplink beam failure event, wherein the report comprises one or more of:
an identification of the third beam,
a cell identification of the first beam, or
an indication of an event type of the uplink beam failure event.

24. The non-transitory computer-readable medium of claim 21, wherein the symbol duration associated with the specified number of symbols, is based at least in part on one or more of:
a numerology of the first beam,
a subcarrier spacing of the first beam,
a numerology of the second beam, or
a subcarrier spacing of the second beam.

25. The non-transitory computer-readable medium of claim 21, wherein the resetting time period comprises:
a first number of first symbols based at least in part on physical downlink control channel processing latency, and
a second number of second symbols based at least in part on beam switching latency,
wherein the first number of first symbols is based at least in part on one or more of a numerology or a subcarrier spacing of the second beam, and
wherein the second number of second symbols is based at least in part on one or more of a numerology or a subcarrier spacing of the first beam.

26. An apparatus for wireless communication, comprising:
means for detecting an uplink beam failure event for a first beam associated with a first component carrier;
means for reporting, via a second beam associated with a second component carrier that is different from the first component carrier, the uplink beam failure event,
wherein the first beam is in a first frequency band that is different from a second frequency band of the second beam; and
means for communicating via a third beam associated with a third component carrier that is different from the first component carrier based at least in part on an expiration of a resetting time period,
wherein the third beam is in a third frequency band that is different from the first frequency band,
wherein the resetting time period comprises a specified number of symbols, wherein a time duration of the resetting time period is determined based at least in part on a symbol duration associated with the specified number of symbols, and wherein a response associated with reporting the uplink beam failure event configures the apparatus to determine a start of a duration of the resetting time period as corresponding to a time at which the response associated with reporting the uplink beam failure event is received.

27. The apparatus of claim 26, wherein the means for detecting the uplink beam failure event for the first beam comprises:

means for determining that a communication via the first beam would fail to satisfy a maximum permissible exposure metric.

28. The apparatus of claim 26, wherein the means for reporting the uplink beam failure event comprises:

means for transmitting a report of the uplink beam failure event, wherein the report comprises one or more of:
an identification of the third beam,
a cell identification of the first beam, or
an indication of an event type of the uplink beam failure event.

29. The apparatus of claim 26, wherein the symbol duration associated with the specified number of symbols, is based at least in part on one or more of:
a numerology of the first beam,
a subcarrier spacing of the first beam,
a numerology of the second beam, or
a subcarrier spacing of the second beam.

30. The apparatus of claim 26, wherein the resetting time period comprises:

a first number of first symbols based at least in part on physical downlink control channel processing latency, and a second number of second symbols based at least in part on beam switching latency,
wherein the first number of first symbols is based at least in part on one or more of a numerology or a subcarrier spacing of the third beam, and
wherein the second number of second symbols is based at least in part on one or more of a numerology or a subcarrier spacing of the first beam.

* * * * *